(12) United States Patent
Grichnik et al.

(10) Patent No.: US 7,917,333 B2
(45) Date of Patent: Mar. 29, 2011

(54) VIRTUAL SENSOR NETWORK (VSN) BASED CONTROL SYSTEM AND METHOD

(75) Inventors: Anthony J. Grichnik, Peoria, IL (US); Mary L. Kesse, Peoria, IL (US); Amit Jayachandran, Peoria, IL (US); James Mason, Peoria, IL (US); Tim Felty, Peoria, IL (US); Christopher L. Wynkoop, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 160 days.

(21) Appl. No.: 12/222,957

(22) Filed: Aug. 20, 2008

(65) Prior Publication Data
US 2010/0050025 A1  Feb. 25, 2010

(51) Int. Cl.
*G06F 11/30* (2006.01)

(52) U.S. Cl. .......... 702/182; 123/486; 123/488; 700/29; 700/48; 701/29; 701/36; 702/104; 702/116; 702/189; 714/47; 714/E11.2

(58) Field of Classification Search .................. 123/486, 123/488; 700/29, 48, 117; 701/29, 36; 714/47, 714/E11.2; 702/104, 116, 182, 189
See application file for complete search history.

(56) References Cited

U.S. PATENT DOCUMENTS

| | | | |
|---|---|---|---|
| 3,316,395 | A | 4/1967 | Lavin |
| 4,136,329 | A | 1/1979 | Trobert |
| 4,533,900 | A | 8/1985 | Muhlberger et al. |
| 5,014,220 | A | 5/1991 | McMann et al. |
| 5,163,412 | A | 11/1992 | Neu et al. |
| 5,262,941 | A | 11/1993 | Saladin et al. |
| 5,341,315 | A | 8/1994 | Niwa et al. |
| 5,386,373 | A | 1/1995 | Keeler et al. |
| 5,434,796 | A | 7/1995 | Weininger |
| 5,539,638 | A | 7/1996 | Keeler et al. |

(Continued)

FOREIGN PATENT DOCUMENTS

EP  1103926  5/2001

(Continued)

OTHER PUBLICATIONS

De Santos et al., 'Virtual Sensors for Walking Robots', 2006, Text book, pp. 191-211.*

(Continued)

*Primary Examiner* — Eliseo Ramos Feliciano
*Assistant Examiner* — Elias Desta
(74) *Attorney, Agent, or Firm* — Finnegan, Henderson, Farabow, Garrett & Dunner LLP

(57) ABSTRACT

A method for providing a virtual sensor network based system. The method may include obtaining project data descriptive of a virtual sensor network to be used in a control system of a machine; establishing a virtual sensor network including a plurality of virtual sensors based on the project data. Each virtual sensor may have a model type, at least one input parameter, and at least one output parameter. The method may also include recording model information, measurement data, and performance information of the virtual sensor network including the plurality of virtual sensors; creating one or more calibration certificates of the virtual sensor network including a plurality of virtual sensors based on the model information, the measurement data, and the performance information; and generating a documentation package associated with the virtual sensor network. The documentation package may include at least an identification, the project data, and at least one calibration certificate of the virtual sensor network including a plurality of virtual sensors.

23 Claims, 12 Drawing Sheets

U.S. PATENT DOCUMENTS

| | | |
|---|---|---|
| 5,548,528 A | 8/1996 | Keeler et al. |
| 5,561,610 A | 10/1996 | Schricker et al. |
| 5,566,091 A | 10/1996 | Schricker et al. |
| 5,585,553 A | 12/1996 | Schricker |
| 5,594,637 A | 1/1997 | Eisenberg et al. |
| 5,598,076 A | 1/1997 | Neubauer et al. |
| 5,604,306 A | 2/1997 | Schricker |
| 5,604,895 A | 2/1997 | Raimi |
| 5,608,865 A | 3/1997 | Midgely et al. |
| 5,666,297 A | 9/1997 | Britt et al. |
| 5,682,317 A | 10/1997 | Keeler et al. |
| 5,698,780 A | 12/1997 | Mizutani et al. |
| 5,727,128 A | 3/1998 | Morrison |
| 5,750,887 A | 5/1998 | Schricker |
| 5,752,007 A | 5/1998 | Morrison |
| 5,835,902 A | 11/1998 | Jannarone |
| 5,842,202 A | 11/1998 | Kon |
| 5,914,890 A | 6/1999 | Sarangapani et al. |
| 5,925,089 A | 7/1999 | Fujime |
| 5,950,147 A | 9/1999 | Sarangapani et al. |
| 5,966,312 A | 10/1999 | Chen |
| 5,987,976 A | 11/1999 | Sarangapani |
| 6,086,617 A | 7/2000 | Waldon et al. |
| 6,092,016 A | 7/2000 | Sarangapani et al. |
| 6,119,074 A | 9/2000 | Sarangapani |
| 6,145,066 A | 11/2000 | Atkin |
| 6,195,648 B1 | 2/2001 | Simon et al. |
| 6,199,007 B1 | 3/2001 | Zavarehi et al. |
| 6,208,982 B1 | 3/2001 | Allen, Jr. et al. |
| 6,223,133 B1 | 4/2001 | Brown |
| 6,236,908 B1 | 5/2001 | Cheng et al. |
| 6,240,343 B1 | 5/2001 | Sarangapani et al. |
| 6,269,351 B1 | 7/2001 | Black |
| 6,298,718 B1 | 10/2001 | Wang |
| 6,370,544 B1 | 4/2002 | Krebs et al. |
| 6,405,122 B1 | 6/2002 | Yamaguchi |
| 6,438,430 B1 | 8/2002 | Martin et al. |
| 6,442,511 B1 | 8/2002 | Sarangapani et al. |
| 6,477,660 B1 | 11/2002 | Sohner |
| 6,513,018 B1 | 1/2003 | Culhane |
| 6,546,379 B1 | 4/2003 | Hong et al. |
| 6,584,768 B1 | 7/2003 | Hecker et al. |
| 6,594,989 B1 | 7/2003 | Hepburn et al. |
| 6,698,203 B2 | 3/2004 | Wang |
| 6,711,676 B1 | 3/2004 | Zomaya et al. |
| 6,721,606 B1 | 4/2004 | Kaji et al. |
| 6,725,208 B1 | 4/2004 | Hartman et al. |
| 6,763,708 B2 | 7/2004 | Ting et al. |
| 6,775,647 B1 | 8/2004 | Evans et al. |
| 6,785,604 B2 | 8/2004 | Jacobson |
| 6,810,442 B1 | 10/2004 | Lin et al. |
| 6,823,675 B2 | 11/2004 | Brunell et al. |
| 6,859,770 B2 | 2/2005 | Ramsey |
| 6,859,785 B2 | 2/2005 | Case |
| 6,865,883 B2 | 3/2005 | Gomulka |
| 6,882,929 B2 | 4/2005 | Liang et al. |
| 6,895,286 B2 | 5/2005 | Kaji et al. |
| 6,935,313 B2 | 8/2005 | Jacobson |
| 6,941,287 B1 | 9/2005 | Vaidyanathan et al. |
| 6,952,662 B2 | 10/2005 | Wegerich et al. |
| 6,976,062 B1 | 12/2005 | Denby et al. |
| 6,988,093 B2 | 1/2006 | Pic et al. |
| 7,000,229 B2 | 2/2006 | Gere |
| 7,024,343 B2 | 4/2006 | El-Ratal |
| 7,027,953 B2 | 4/2006 | Klein |
| 7,035,740 B2 | 4/2006 | Kermani |
| 7,035,834 B2 | 4/2006 | Jacobson |
| 7,117,079 B2 | 10/2006 | Streichsbier et al. |
| 7,124,047 B2 | 10/2006 | Zhang et al. |
| 7,127,892 B2 | 10/2006 | Akins et al. |
| 7,174,284 B2 | 2/2007 | Dolansky et al. |
| 7,178,328 B2 | 2/2007 | Solbrig |
| 7,191,161 B1 | 3/2007 | Rai et al. |
| 7,194,392 B2 | 3/2007 | Tuken et al. |
| 7,213,007 B2 | 5/2007 | Grichnik |
| 7,284,043 B2 | 10/2007 | Feinleib et al. |
| 7,356,393 B1 | 4/2008 | Schlatre et al. |
| 7,369,925 B2 | 5/2008 | Morioka et al. |
| 7,542,600 B2 | 6/2009 | Yu et al. |
| 7,593,804 B2 * | 9/2009 | Grichnik et al. ............... 701/101 |
| 7,693,683 B2 | 4/2010 | Ihara |
| 7,787,969 B2 | 8/2010 | Grichnik et al. |
| 2002/0014294 A1 | 2/2002 | Okano et al. |
| 2002/0016701 A1 | 2/2002 | Duret et al. |
| 2002/0042784 A1 | 4/2002 | Kerven et al. |
| 2002/0049704 A1 | 4/2002 | Vanderveldt et al. |
| 2002/0103996 A1 | 8/2002 | LeVasseur et al. |
| 2002/0146178 A1 | 10/2002 | Bolle et al. |
| 2002/0198821 A1 | 12/2002 | Munoz |
| 2003/0018503 A1 | 1/2003 | Shulman |
| 2003/0055607 A1 | 3/2003 | Wegerich et al. |
| 2003/0093250 A1 | 5/2003 | Goebel |
| 2003/0126053 A1 | 7/2003 | Boswell et al. |
| 2003/0126103 A1 | 7/2003 | Chen et al. |
| 2003/0130855 A1 | 7/2003 | Babu et al. |
| 2003/0167354 A1 | 9/2003 | Peppers et al. |
| 2003/0187567 A1 | 10/2003 | Sulatisky et al. |
| 2003/0187584 A1 | 10/2003 | Harris |
| 2003/0200296 A1 | 10/2003 | Lindsey |
| 2004/0022441 A1 | 2/2004 | Cecala et al. |
| 2004/0030420 A1 | 2/2004 | Ulyanov et al. |
| 2004/0034857 A1 | 2/2004 | Mangino et al. |
| 2004/0059518 A1 | 3/2004 | Rothschild |
| 2004/0077966 A1 | 4/2004 | Yamaguchi et al. |
| 2004/0122702 A1 | 6/2004 | Sabol et al. |
| 2004/0122703 A1 | 6/2004 | Walker et al. |
| 2004/0128058 A1 | 7/2004 | Andres et al. |
| 2004/0135677 A1 | 7/2004 | Asam |
| 2004/0138995 A1 | 7/2004 | Hershkowitz et al. |
| 2004/0153227 A1 | 8/2004 | Hagiwara et al. |
| 2004/0230404 A1 | 11/2004 | Messmer et al. |
| 2004/0267818 A1 | 12/2004 | Hartenstine |
| 2005/0047661 A1 | 3/2005 | Maurer |
| 2005/0055176 A1 | 3/2005 | Clarke et al. |
| 2005/0091093 A1 | 4/2005 | Bhaskaran et al. |
| 2005/0209943 A1 | 9/2005 | Ballow et al. |
| 2005/0210337 A1 | 9/2005 | Chester et al. |
| 2005/0240539 A1 | 10/2005 | Olavson |
| 2005/0261791 A1 | 11/2005 | Chen et al. |
| 2005/0262031 A1 | 11/2005 | Saidi et al. |
| 2005/0278227 A1 | 12/2005 | Esary et al. |
| 2005/0278432 A1 | 12/2005 | Feinleib et al. |
| 2006/0010057 A1 | 1/2006 | Bradway et al. |
| 2006/0010142 A1 | 1/2006 | Kim et al. |
| 2006/0010157 A1 | 1/2006 | Dumitrascu et al. |
| 2006/0025897 A1 | 2/2006 | Shostak et al. |
| 2006/0026270 A1 | 2/2006 | Sadovsky et al. |
| 2006/0026587 A1 | 2/2006 | Lemarroy et al. |
| 2006/0064474 A1 | 3/2006 | Feinleib et al. |
| 2006/0068973 A1 | 3/2006 | Kappauf et al. |
| 2006/0129289 A1 | 6/2006 | Kumar et al. |
| 2006/0130052 A1 | 6/2006 | Allen et al. |
| 2006/0210168 A1 | 9/2006 | Kim et al. |
| 2006/0229753 A1 | 10/2006 | Seskin et al. |
| 2006/0229769 A1 | 10/2006 | Grichnik et al. |
| 2006/0229852 A1 | 10/2006 | Grichnik et al. |
| 2006/0229854 A1 | 10/2006 | Grichnik et al. |
| 2006/0230018 A1 | 10/2006 | Grichnik et al. |
| 2006/0230097 A1 | 10/2006 | Grichnik et al. |
| 2006/0230313 A1 | 10/2006 | Grichnik et al. |
| 2006/0241923 A1 | 10/2006 | Xu et al. |
| 2006/0245631 A1 | 11/2006 | Levenson et al. |
| 2006/0247798 A1 | 11/2006 | Subbu et al. |
| 2007/0061144 A1 | 3/2007 | Grichnik et al. |
| 2007/0094048 A1 | 4/2007 | Grichnik |
| 2007/0094181 A1 | 4/2007 | Tayebnejad et al. |
| 2007/0118338 A1 | 5/2007 | Grichnik et al. |
| 2007/0124237 A1 | 5/2007 | Sundararajan et al. |
| 2007/0150332 A1 | 6/2007 | Grichnik et al. |
| 2007/0168494 A1 | 7/2007 | Liu et al. |
| 2007/0179769 A1 | 8/2007 | Grichnik et al. |
| 2007/0203864 A1 | 8/2007 | Grichnik |
| 2008/0154811 A1 | 6/2008 | Grichnik et al. |
| 2008/0201054 A1 | 8/2008 | Grichnik et al. |
| 2009/0118841 A1 | 5/2009 | Grichnik et al. |
| 2009/0119065 A1 * | 5/2009 | Grichnik et al. ............... 702/182 |
| 2010/0050025 A1 | 2/2010 | Grichnik et al. |

FOREIGN PATENT DOCUMENTS

| | | |
|---|---|---|
| EP | 1367248 | 12/2003 |
| EP | 1418481 | 5/2004 |
| JP | 10-332621 | 12/1998 |
| JP | 11-351045 | 12/1999 |
| JP | 2002-276344 | 9/2002 |
| WO | WO97/42581 | 11/1997 |
| WO | WO02/057856 | 7/2002 |
| WO | WO2006/017453 | 2/2006 |

OTHER PUBLICATIONS

Tilak, Dynamic Resources Discovery for Sensor Networks, 2005, UCSD Publication, pp. 785-796.*

Oberstar, 'Fixed-Point Representation & Fractional Math', Aug. 30, 2007, Oberster Consulting, pp. 1-18.*

Allen et al., "Supersaturated Designs That Maximize the Probability of Identifying Active Factors," 2003 American Statistical Association and the American Society for Quality, Technometrics, vol. 45, No. 1, Feb. 2003, pp. 1-8.

April, Jay et al., "Practical Introduction to Simulation Optimization," Proceedings of the 2003 Winter Simulation Conference, pp. 71-78.

Bandte et al., "Viable Designs Through a Joint Probabilistic Estimation Technique," SAE International, and the American Institute of Aeronautics and Astronautics, Inc., Paper No. 1999-01-5623, 1999, pp. 1-11.

Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.

Berke et al., "Optimum Design of Aerospace Structural Components Using Neural Networks," Computers and Structures, vol. 48, No. 6, Sep. 17, 1993, pp. 1001-1010.

Bezdek, "Genetic Algorithm Guided Clustering," IEEE 0-7803-1899-4/94, 1994, pp. 34-39.

Brahma et al., "Optimization of Diesel Engine Operating Parameters Using Neural Networks," SAE Technical Paper Series, 2003-01-3228, Oct. 27-30, 2003 (11 pages).

Chau et al., "Use of runs test to access cardiovascular autonomic function in diabetic subjects," Abstract, Diabetes Care, vol. 17, Issue 2, pp. 146-148, available at http://care.diabetesjournals.org/cgi/content/abstract/17/2/146).

Chung et al., "Process Optimal Design in Forging by Genetic Algorithm," Journal of Manufacturing Science and Engineering, vol. 124, May 2002, pp. 397-408.

Cox et al., "Statistical Modeling for Efficient Parametric Yield Estimation of MOS VLSI Circuits," IEEE, 1983, pp. 242-245.

De Maesschalck et al., "The Mahalanobis Distance," Chemometrics and Intelligent Laboratory Systems, vol. 50, No. 1, Jan. 2000, pp. 1-18.

Dikmen et al., "Estimating Distributions in Genetic Algorithms," ISCIS 2003, LNCS 2869, 2003, pp. 521-528.

Galperin, G., et al., "Parallel Monte-Carlo Simulation of Neural Network Controllers," available at http://www-fp.mcs.anl.gov/ccst/research/reports_pre1998/neural_network/galperin.html, printed Mar. 11, 2005 (6 pages).

Gletsos et al., "A Computer-Aided Diagnostic System to Characterize CT Focal Liver Lesions: Design and Optimization of a Neural Network Classifier," IEEE Transactions on InformationTechnology in Biomedicine, vol. 7, No. 3, Sep. 2003 pp. 153-162.

Grichnik et al., "An Improved Metric for Robust Engineering," Proceedings of the 2007 International Conference on Scientific Computing, Las Vegas, NV (4 pages).

Grichnik et al., Copending U.S. Appl. No. 11/529,267, filed Sep. 29, 2006, entitled Virtual Sensor Based Engine Control System and Method.

Grichnik et al., Copending U.S. Appl. No. 11/730,363, filed Mar. 30, 2007, entitled Prediction Based Engine Control System and Method.

Grichnik et al., Copending U.S. Appl. No. 11/812,164, filed Jun. 15, 2007, entitled Virtual Sensor System and Method.

Grichnik et al., Copending U.S. Appl. No. 11/979,408, filed Nov. 2, 2007, entitled Virtual Sensor Network (VSN) System and Method.

Holland, John H., "Genetic Algorithms," Scientific American, Jul. 1992, pp. 66-72.

Hughes et al., "Linear Statistics for Zeros of Riemann's Zeta Function," C.R. Acad. Sci. Paris, Ser. I335 (2002), pp. 667-670.

Ko et al., "Application of Artificial Neural Network and Taguchi Method to Perform Design in Metal Forming Considering Workability," International Journal of Machine Tools & Manufacture, vol. 39, No. 5, May 1999, pp. 771-785.

Kroha et al., "Object Server on a Parallel Computer," 1997 IEEE 0-8186-8147-0/97, pp. 284-288.

Mavris et al., "A Probabilistic Approach to Multivariate Constrained Robust Design Simulation," Society of Automotive Engineers, Inc., Paper No. 975508, 1997, pp. 1-11.

National Institute of Health, "10-year CVD Risk Calculator" available at http://hin.nhlbi.nih.gov/atpiii/calculator.asp?usertype=prof, printed Aug. 2, 2005, 2 pages.

Obayashi et al, "Multiobjective Evolutionary Computation for Supersonic Wing-Shape Optimization," IEEE Transactions on Evolutionary Computation, vol. 4, No. 2, Jul. 2000, pp. 182-187.

Simpson et al., "Metamodels for Computer-Based Engineering Design: Survey & Recommendations," Engineering with Computers, 2001, vol. 17, pp. 129-150.

Song et al., "The Hyperellipsoidal Clustering Using Genetic Algorithm," 1997 IEEE International Conference on Intelligent Processing Systems, Oct. 28-31, 1997, Beijing, China, pp. 592-596.

Sytsma, Sid, "Quality and Statistical Process Control," available at http://www.sytsma.com/tqmtools/ctlchtprinciples.html, printed Apr. 7, 2005, 6 pages.

Taguchi et al., "The Mahalanobis-Taguchi Strategy," A Pattern Technology System, John Wiley & Sons, Inc., 2002, 234 pages.

Taylor et al., "Guidelines for Evaluating and Expressing the Uncertainty of NIST Measurement Results," NIST Technical Note 1297, 1994 Edition, United States Dept. of Commerce, National Institute of Standards and Technology (25 pages).

Thompson, G.J. et al., "Neural Network Modelling of the Emissions and Performance of a Heavy-Duty Diesel Engine," Proc. Instu. Mech. Engrs., vol. 214, Part D (2000), pp. 111-126.

Traver, Michael L. et al., "A Neural Network-Based Virtual NOx Sensor for Diesel Engines," West Virginia University, Mechanical and Aerospace Engineering Dept., Morgantown, WV 26506-6101, 6106, 7 pages.

Traver, Michael L. et al., "Neural Network-Based Diesel Engine Emissions Prediction Using In-Cylinder Combustion Pressure," International Spring Fuels & Lubricants Meeting & Exposition, SAE Technical Paper Series, May 3-6, 1999, 17 pages.

Woodall, Tsui et al., "A Review and Analysis of the Mahalanobis-Taguchi System," Technometrics, Feb. 2003, vol. 45, No. 1 (15 pages).

Wu et al., "Cam-phasing Optimization Using Artificial Neural Networks as Surrogate Models—Fuel Consumption and Nox Emissions," SAE Technical Paper Series, 2006-01-1512, Apr. 3-6, 2006 (19 pages).

Yang et al., "Similar Cases Retrieval from the Database of Laboratory Test Results," Journal of Medical Systems, vol. 27, No. 3, Jun. 2003, pp. 271-282.

Yuan et al., "Evolutionary Fuzzy C-Means Clustering Algorithm," 1995 IEEE 0-7803-2461-7/95, pp. 2221-2226.

Traver, Michael L. et al., "A Neural Network-Based Virtual NOx Sensor for Diesel Engines," West Virginia University, Mechanical and Aerospace Engineering Dept., Morgantown, WV, Apr. 2000 (7 pages).

Desantos et al., "Virtual Sensors for Walking Robots," pp. 191-211 (2006).

Ghysels et al., "Testing for Structural Change in the Presence of Auxiliary Models," 2001, pp. 1-41.

Liu et al., "Specification Tests in the Efficient Method of Moments Framework with Application to the Stochastic Volatility Models," 1996, Carnegie Mellon University, pp. 1-31.

Oberstar, "Fixed-Point Representation & Fractional Math," Aug. 30, 2007, Oberstar Consulting, pp. 1-18.

Office Action issued in U.S. Appl. No. 11/642,913 on Apr. 30, 2010 (28 pages).

Office Action issued in U.S. Appl. No. 11/642,913 on Sep. 16, 2010 (16 pages).
Office Action issued in U.S. Appl. No. 12/222,957 on Apr. 28, 2010 (18 pages).
Thompson et al., "Neural Network Modeling of the Emissions and Performance of a Heavy-Duty Diesel Engine," Proc. Inst. Mech. Engrs., vol. 214, Part D,. 2000, pp. 111-126.
Tilak, "Dynamic Resources Discovery for Sensor Networks," 2005, UCSD Publication, pp. 785-796.
Traver et al., "A Neural Network-Based Virtual Nox Sensor for Diesel Engines," West Virginia University, Mechanical and Aerospace Engineering Dept., Morgantown, WV 26506-6106 (2000).

\* cited by examiner

VIRTUAL SENSOR NETWORK (VSN) BASED CONTROL SYSTEM AND METHOD

TECHNICAL FIELD

This disclosure relates generally to computer based virtual sensor techniques and, more particularly, to virtual sensor network systems and methods.

BACKGROUND

Physical sensors are widely used in many products, such as modern machines, to measure and monitor physical phenomena, such as temperature, speed, and emissions from motor vehicles. Physical sensors often take direct measurements of the physical phenomena and convert these measurements into measurement data to be further processed by control systems. Although physical sensors take direct measurements of the physical phenomena, physical sensors and associated hardware are often costly and, sometimes, unreliable. Further, when control systems rely on physical sensors to operate properly, a failure of a physical sensor may render such control systems inoperable. For example, the failure of an intake manifold pressure sensor in an engine may result in shutdown of the engine entirely even if the engine itself is still operable.

Virtual sensors have been developed to process other various physically measured values and to produce values that were previously measured directly by physical sensors. For example, U.S. Pat. No. 6,275,761 (the '761 patent) issued to Ting on Aug. 14, 2001, discloses a neural network-based virtual sensor for automatic transmission slip. The '761 patent uses a composite slip estimator that utilizes different neural network designs for different operating conditions of the vehicle. A specific neural network-based slip estimator design can be tailored to perform well for limited specific sets of powertrain operating conditions. The specific sets are enveloped into a number of distinct subsets, each corresponding to a different slip estimator designed to perform under those specific conditions.

A modern machine may need multiple sensors to function properly, and multiple virtual sensors may be used. However, conventional multiple virtual sensors are often used independently without taking into account other virtual sensors in an operating environment, which may result in undesired results. For example, multiple virtual sensors may compete for limited computing resources, such as processor, memory, or I/O, etc. An output of one virtual sensor model could also inadvertently become an input to another virtual sensor model, which can result in unpredictable effects in complex control systems relying on these values. Further, other types of interactions among the multiple virtual sensors may cause undesired or unpredictable results, such as feedback loops or transient control instabilities.

Further, conventional multiple virtual sensors are often incapable of being calibrated to provide users information, such as sensing ranges, uncertainty, and sensing conditions about the multiple virtual sensors and, more specifically, the multiple virtual sensors as a whole. Conventional multiple virtual sensors are often also incapable of providing auditing and/or publishing functionalities to comply with various standards.

Methods and systems consistent with certain features of the disclosed systems are directed to solving one or more of the problems set forth above.

SUMMARY

One aspect of the present disclosure includes a method for providing a virtual sensor network based system. The method may include obtaining project data descriptive of a virtual sensor network to be used in a control system of a machine, and establishing a virtual sensor network including a plurality of virtual sensors based on the project data. Each virtual sensor may have a model type, at least one input parameter, and at least one output parameter. The method may also include recording model information, measurement data, and performance information of the virtual sensor network including the plurality of virtual sensors, creating one or more calibration certificate of the virtual sensor network including a plurality of virtual sensors based on the model information, the measurement data, and the performance information, and generating a documentation package associated with the virtual sensor network. The documentation package may include at least an identification, the project data, and the calibration certificate of the virtual sensor network including a plurality of virtual sensors.

Another aspect of the present disclosure includes a system for providing a virtual sensor network based system. The system may include a storage unit that is configured to contain information associated with the virtual sensor network, and a processor. The processor may be configured to obtain project data descriptive of a virtual sensor network to be used in a control system of a machine, and to establish a virtual sensor network including a plurality of virtual sensors based on the project data. Each virtual sensor may have a model type, at least one input parameter, and at least one output parameter. The processor may also be configured to obtain logged information including model information, measurement data, and performance information of the virtual sensor network including the plurality of virtual sensors; to create one or more calibration certificate of the virtual sensor network including a plurality of virtual sensors based on the model information, the measurement data, and the performance information; and to generate a documentation package associated with the virtual sensor network. The documentation package may include at least an identification, the project data, and the calibration certificate of the virtual sensor network including a plurality of virtual sensors.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
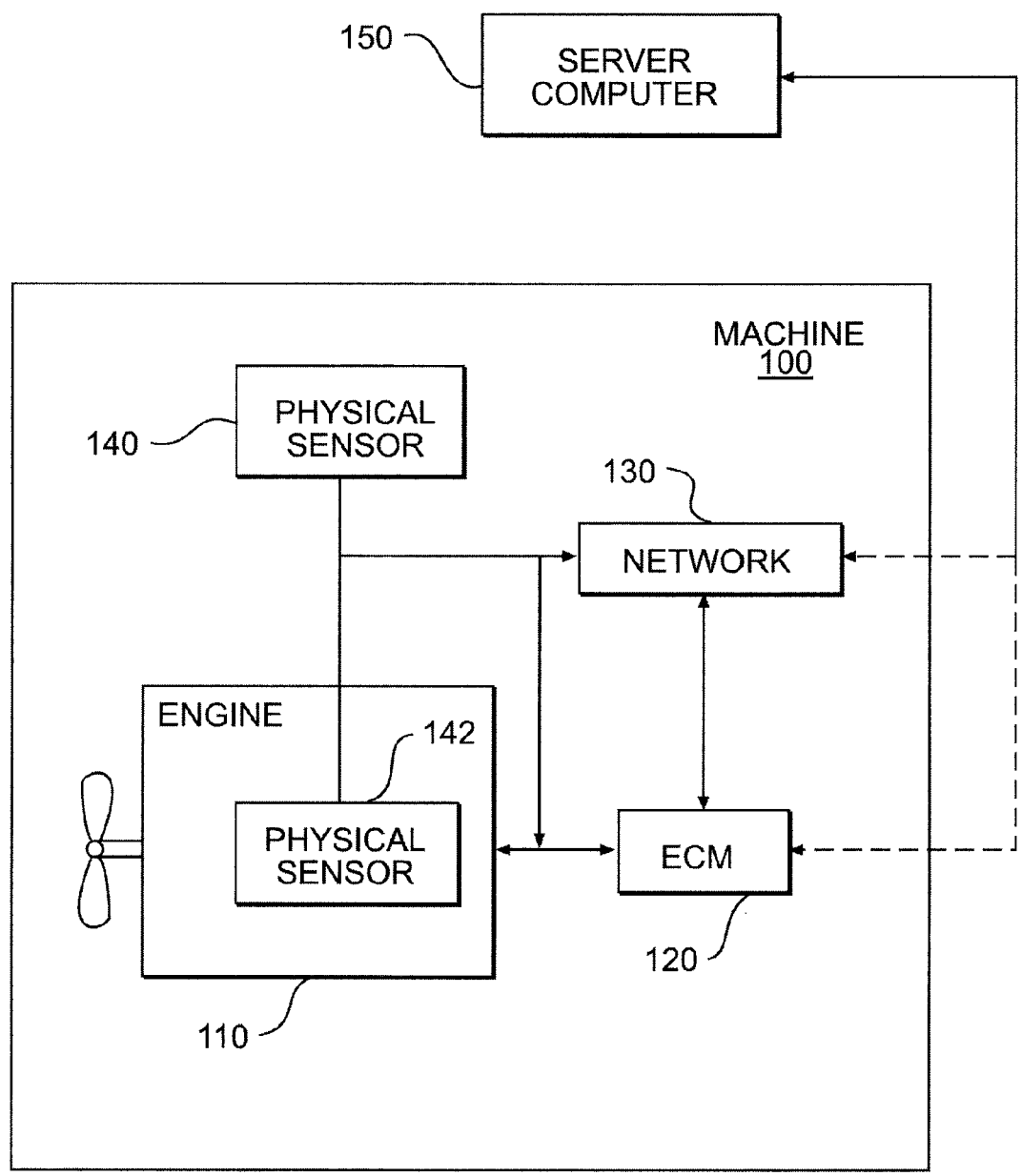
FIG. 1 illustrates an exemplary block diagram of a machine in which features and principles consistent with certain disclosed embodiments may be incorporated.

FIG. 1 illustrates an exemplary machine 100 in which features and principles consistent with certain disclosed embodiments may be incorporated. Machine 100 may refer to any type of stationary or mobile machine that performs some type of operation associated with a particular industry. Machine 100 may also include any type of commercial vehicle such as cars, vans, and other vehicles. Other types of machines may also be included.

As shown in FIG. 1, machine 100 may include an engine 110, an electronic control module (ECM) 120, a virtual sensor network system 130, and physical sensors 140 and 142. Engine 110 may include any appropriate type of engine or power source that generates power for machine 100, such as an internal combustion engine or fuel cell generator. ECM 120 may include any appropriate type of engine control system configured to perform engine control functions such that engine 110 may operate properly. ECM 120 may include any number of devices, such as microprocessors or microcontrollers, application-specific integrated circuits (ASICs), field programmable gate arrays (FPGAs), memory modules, communication devices, input/output devices, storages devices, etc., to perform such control functions. Further, computer software instructions may be stored in or loaded to ECM 120. ECM 120 may execute the computer software instructions to perform various control functions and processes.

Although ECM 120 is shown to control engine 110 (an engine ECM), ECM 120 may also control other systems of machine 100, such as transmission systems and/or hydraulics systems. Multiple ECMs may be included in ECM 120 or may be used on machine 100. For example, a plurality of ECMs may be used to control different systems of machine 100 and also to coordinate operations of these systems. Further, the plurality of ECMs may be coupled together via a communication network to exchange information. Information such as input parameters, output parameters, and parameter values, status of control systems, physical and virtual sensors, and virtual sensor networks may be communicated to the plurality of ECMs simultaneously.

Physical sensor 140 may include one or more sensors provided for measuring certain parameters of machine operating environment. For example, physical sensor 140 may include physical emission sensors for measuring emissions of machine 100, such as Nitrogen Oxides ($NO_x$), Sulfur Dioxide ($SO_2$), Carbon Monoxide (CO), total reduced Sulfur (TRS), etc. In particular, $NO_x$ emission sensing and reduction may be important to normal operation of engine 110. Physical sensor 142, on the other hand, may include any appropriate sensors that are used with engine 110 or other machine components (not shown) to provide various measured parameters about engine 110 or other components, such as temperature, speed, acceleration rate, fuel pressure, power output, etc.

Virtual sensor network system 130 may be coupled with physical sensors 140 and 142 and ECM 120 to provide control functionalities based on integrated virtual sensors. A virtual sensor, as used herein, may refer to a mathematical algorithm or model that produces output measures comparable to a physical sensor based on inputs from other systems, such as physical sensors 140 and 142. For example, a physical $NO_x$ emission sensor may measure the $NO_x$ emission level of machine 100 and provide values of $NO_x$ emission level to other components, such as ECM 120. A virtual $NO_x$ emission sensor may provide calculated values of $NO_x$ emission level to ECM 120 based on other measured or calculated parameters, such as compression ratios, turbocharger efficiencies, aftercooler characteristics, temperature values, pressure values, ambient conditions, fuel rates, engine speeds, etc. The term "virtual sensor" may be used interchangeably with "virtual sensor model."

A virtual sensor network, as used herein, may refer to a collection of virtual sensors integrated and working together using certain control algorithms such that the collection of virtual sensors may provide more desired or more reliable sensor output parameters than discrete individual virtual sensors. Virtual sensor network system 130 may include a plurality of virtual sensors configured or established according to certain criteria based on a particular application. Virtual sensor network system 130 may also facilitate or control operations of the plurality virtual sensors. The plurality of virtual sensors may include any appropriate virtual sensor providing sensor output parameters corresponding to one or more physical sensors in machine 100.

Further, virtual sensor network system 130 may be configured as a separate control system or, alternatively, may coincide with other control systems such as ECM 120. Virtual sensor network system 130 may also operate in series with or in parallel to ECM 120.

A server computer 150 may be coupled to machine 100, either onboard machine 100 or at an offline location. Server computer 150 may include any appropriate computer system configured to create, train, and validate virtual sensor models and/or virtual sensor network models. Server computer 150 may also deploy the virtual sensor models and/or the virtual sensor network models to virtual sensor network system 130 and/or ECM 120, if virtual sensor network 130 coincides with ECM 120. Further, server computer 150 may communicate with virtual sensor network system 130 and/or ECM 120 to exchange operational and configuration data. Server computer 150 may communicate with virtual sensor network system 130 and/or ECM 120 via any appropriate communication means, such as a computer network or a wireless telecommunication link.

Figure 2:
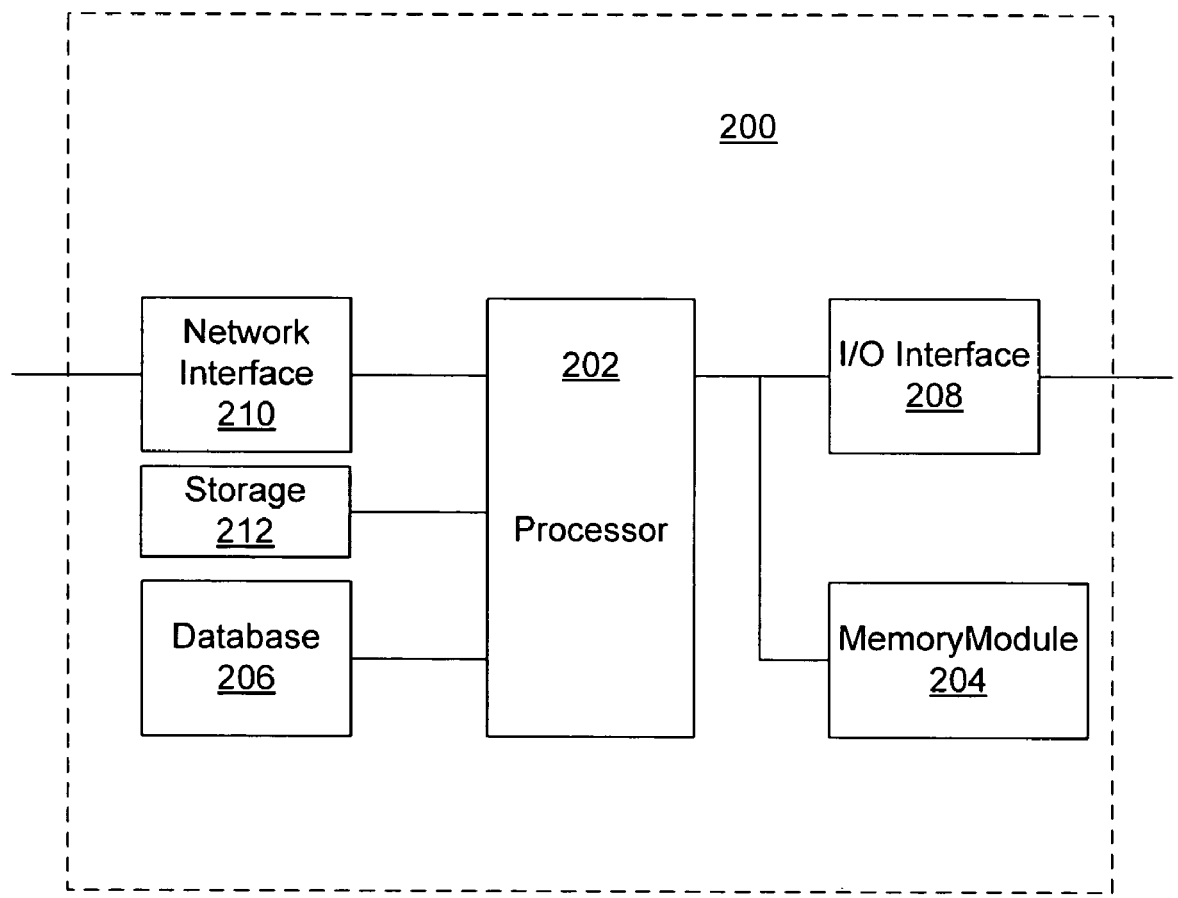
FIG. 2 illustrates a logical block diagram of an exemplary computer system consistent with certain disclosed embodiments.

Virtual sensor network system 130 and/or ECM 120 may be implemented by any appropriate computer system. FIG. 2 shows an exemplary functional block diagram of a computer system 200 configured to implement virtual sensor network system 130 and/or ECM 120. Computer system 200 may also include server computer 150 configured to design, train, and validate virtual sensors in virtual sensor network 130 and other components of machine 100.

As shown in FIG. 2, computer system 200 (e.g., virtual sensor network system 130, etc.) may include a processor 202, a memory module 204, a database 206, an I/O interface 208, a network interface 210, and a storage unit 212. Other components, however, may also be included in computer system 200.

Processor 202 may include any appropriate type of general purpose microprocessor, digital signal processor, or microcontroller. Memory module 204 may include one or more memory devices including, but not limited to, a ROM, a flash memory, a dynamic RAM, and a static RAM. Memory module 204 may be configured to store information used by processor 202. Database 206 may include any type of appropriate database containing information related to virtual sensor networks, such as characteristics of measured parameters, sensing parameters, mathematical models, and/or any other control information.

Further, I/O interface 208 may also be configured to obtain data from input/output devices, such as various sensors or other components (e.g., physical sensors 140 and 142) and/or to transmit data to these components. Network interface 210 may include any appropriate type of network device capable of communicating with other computer systems based on one or more wired or wireless communication protocols. Storage 212 may include any appropriate type of storage provided to store any type of information that processor 202 may need to operate. For example, storage 212 may include one or more hard disk devices, optical disk devices, or other storage devices to provide storage space. Any or all of the components of computer system 200 may be implemented or integrated into an application-specific integrated circuit (ASIC) or field programmable gate array (FPGA) device, or other integrated circuit devices.

Figure 3A:
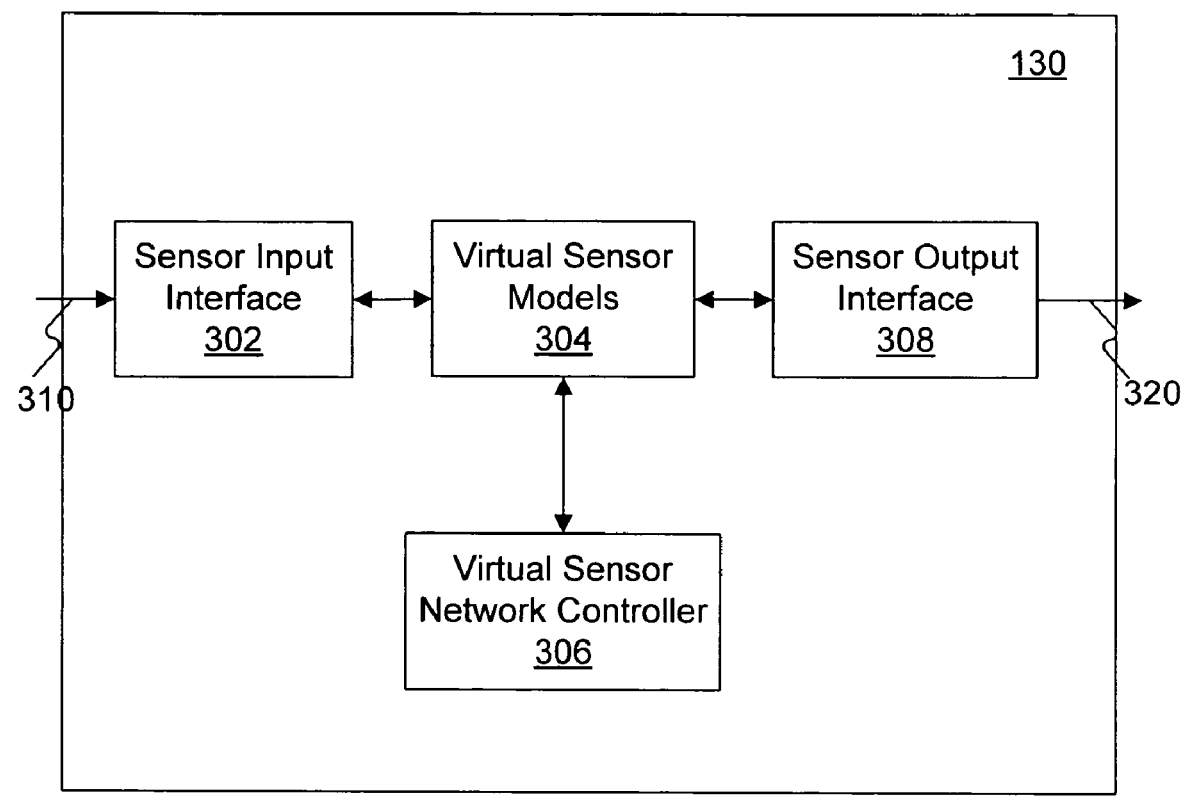
FIG. 3A illustrates a block diagram of an exemplary virtual sensor network system consistent with certain disclosed embodiments.

FIG. 3A shows a functional block diagram of virtual sensor network system 130 consistent with the disclosed embodiments. As shown in FIG. 3A, virtual sensor network system 130 may include a sensor input interface 302, virtual sensor models 304, a virtual sensor network controller 306, and a sensor output interface 308. Input parameters 310 are provided to sensor input interface 302 and output parameters 320 are provided by sensor output interface 308.

As explained above, a virtual sensor network may refer to a plurality of virtual sensor models integrated as a collection of virtual sensors to provide sensing functionalities under a central control unit. The plurality of virtual sensors in a virtual sensor network may be integrated to fit a particular system, and the operation of the plurality of virtual sensors may be controlled collectively.

Sensor input interface 302 may include any appropriate interface, such as an I/O interface or a data link configured to obtain information from various physical sensors (e.g., physical sensors 140 and 142). The information may include values of input or control parameters of the physical sensors, operational status of the physical sensors, and/or values of output parameters of the physical sensors. Further, the information may be provided to sensor input interface 302 as input parameters 310.

Sensor output interface 308 may include any appropriate interface, such as an I/O interface or a datalink interface (e.g., an ECM/xPC interface), configured to provide information from virtual sensor models 304 and virtual sensor network controller 306 to external systems, such as ECM 120, or to an external user of virtual sensor network 120. The information may be provided to external systems and/or users as output parameters 320.

Figure 3B:
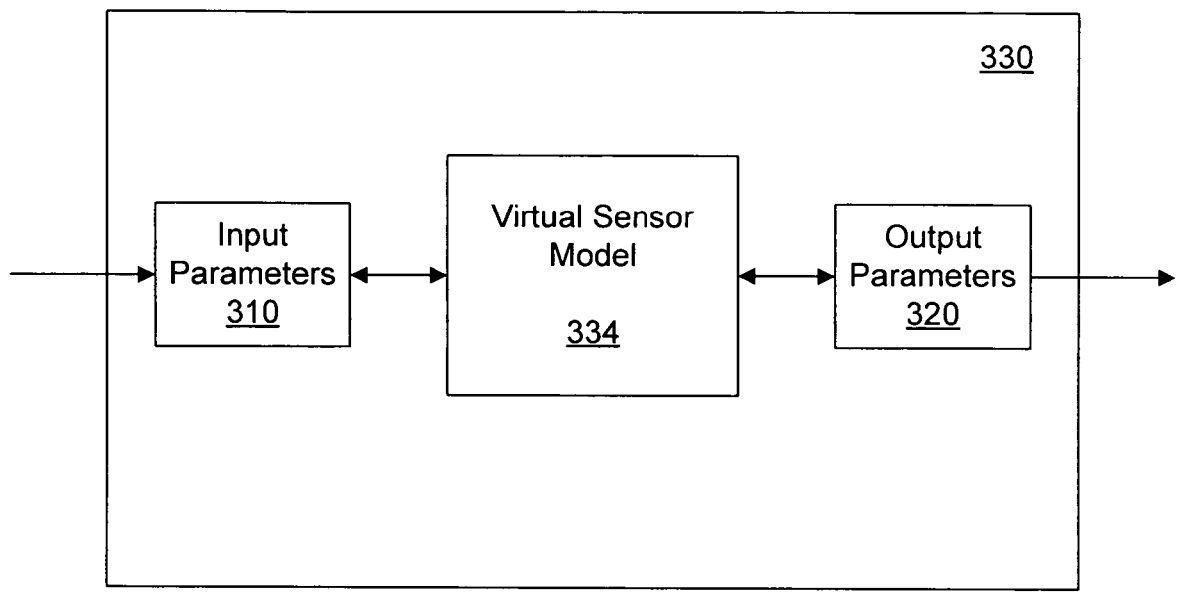
FIG. 3B shows a flowchart of an exemplary virtual sensor consistent with certain disclosed embodiments.

Virtual sensor models 304 may include a plurality of virtual sensors, such as virtual emission sensors, virtual fuel sensors, and virtual speed sensors. Any virtual sensor may be included in virtual sensor models 304. FIG. 3B shows an exemplary virtual sensor consistent with the disclosed embodiments.

As shown in FIG. 3B, virtual sensor 330 may include a virtual sensor model 334, input parameters 310, and output parameters 320. Virtual sensor model 334 may be established to build interrelationships between input parameters 310 (e.g., measured parameters) and output parameters 320 (e.g., sensing parameters). After virtual sensor model 334 is established, values of input parameters 310 may be provided to virtual sensor model 334 to generate values of output parameters 320 based on the given values of input parameters 310 and the interrelationships between input parameters 310 and output parameters 320 established by virtual sensor model 334.

In certain embodiments, virtual sensor 330 may be configured to include a virtual emission sensor to provide levels of substance emitted from an exhaust system (not shown) of engine 110, such as levels of nitrogen oxides ($NO_x$), sulfur dioxide ($SO_2$), carbon monoxide (CO), total reduced sulfur (TRS), soot (i.e., a dark powdery deposit of unburned fuel residues in emission), hydrocarbon (HC), etc. In particular, $NO_x$ emission level, soot emission level, and HC emission level may be important to normal operation of engine 110 and/or to meet certain environmental requirements. Other emission levels, however, may also be included.

Further, virtual sensor 330 or virtual sensor network 130 may be created or configured with fixed-point representation and may be operated through fixed-point arithmetic operation. As used herein, fixed-point representation of a virtual sensor may include fixed-point representation of both data (e.g., numbers) and functions associated with the virtual sensor.

Fixed-point representation of a number may include a data type for the number that has a fixed number of digits before and after the radix point (e.g. "I.F"), where 'I' represents integer digits, 'F' represents fraction digits, and '.' represents the radix point. In certain embodiments, a scaled integer (SI) data type may be used to represent the number. The SI data type may use a basic unit called "scaling," a power of 2, to calculate what size of integer is needed, i.e., 8, 16, or 32 bits, to represent the number. For example, if the scaling is determined as $2^{-10}$, a real number of 72.1243 may be represented in fixed-point by counting a total number of scaling units ($2^{-10}$). The total number may then be used to determine the size of the fixed point number. For the number of 72.1243, a total number of 73855 of $2^{-10}$ is determined. Because this integer (73855) can be represented by 16 bits, that is, internal representation as an unsigned 16 bit number with the value of 73855, the number 72.1243 can be represented by the fixed-point number 73855 and a scaling of $2^{-10}$.

While binary fixed-point numbers can represent fractional powers of two exactly, binary fixed-point numbers cannot exactly represent fractional powers of ten, and approximation may be needed to use binary fixed-point numbers to replace decimal fixed-point or floating-point representations. The degree of approximation may be determined by an allowed error margin or precision. In the above example, the fixed point number has a value of $73855*2^{-10}=72.124023$. This difference is due to the fact that fixed point number with $2^{-10}$ scaling cannot exactly represent that number. Further, fixed-point representation of a function may refer to a function configured to produce a fixed-point output through fixed-point arithmetic operation.

Virtual sensor network 130 or, if virtual sensor network 130 coincides with ECM 120, ECM 120, may implement the fixed-point virtual sensor system 130 using computer software, hardware, or a combination of software and hardware. For example, ECM 120 may execute software programs to generate the values of sensing parameters (e.g., $NO_x$ emission level) based on a computational model and other parameters. By using fixed-point operation, ECM 120 may overcome a lack of floating-point hardware support or may increase the execution speed of the virtual sensor model. Further, in operation, computer software instructions may be stored in or loaded to ECM 120. ECM 120 may execute the computer software instructions to perform various control functions and processes to control engine 110 and to automatically adjust engine operational parameters, such as fuel injection timing and fuel injection pressure, etc. In particular, ECM 120 may execute computer software instructions to operate virtual sensor network 130 and virtual sensors with fixed-point representation to provide engine emission values and other parameter values used to control engine 110.

Figure 4:
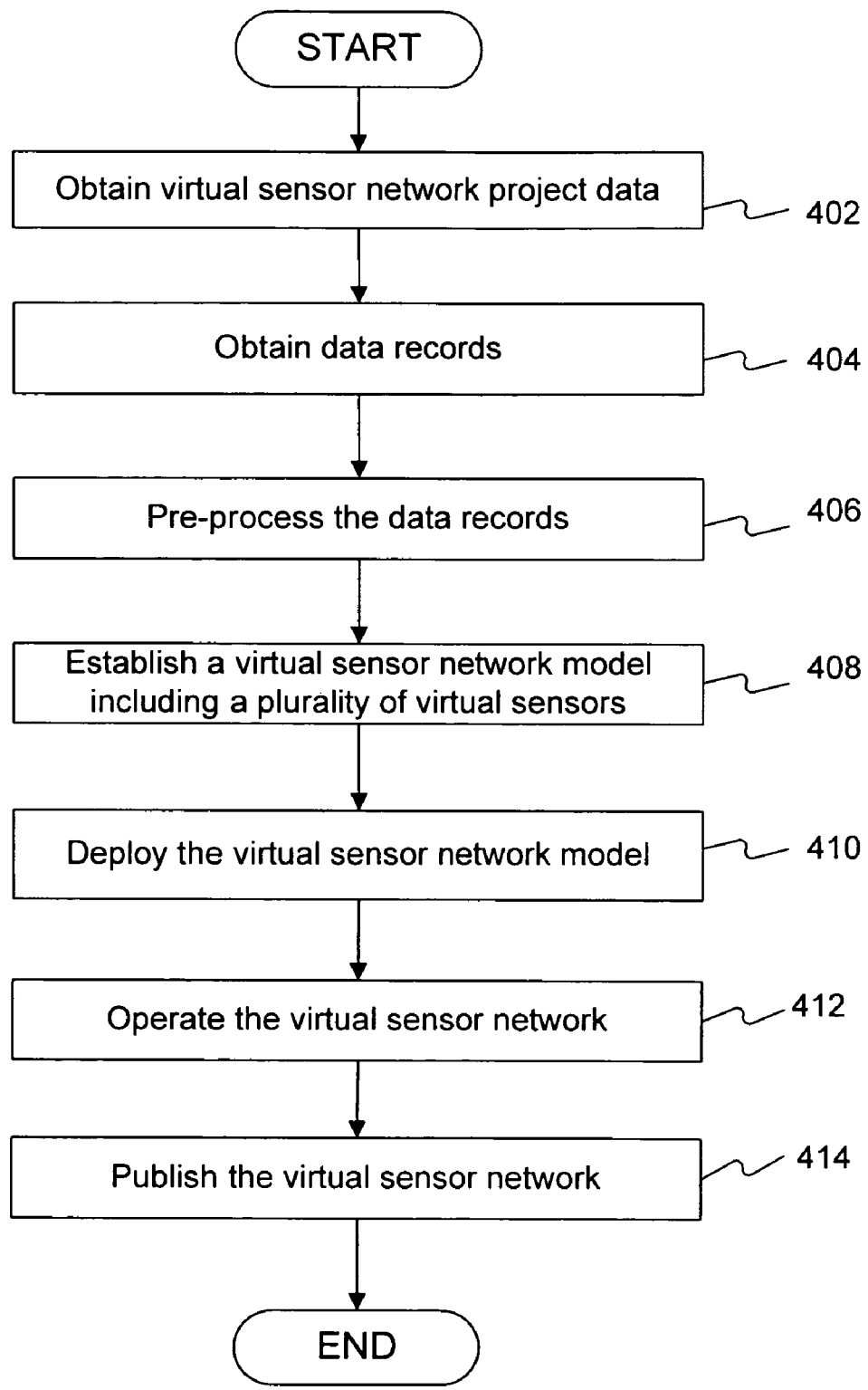
FIG. 4 illustrates a flowchart of an exemplary overall process for establishing, deploying, operating, and publishing a virtual sensor network consistent with certain disclosed embodiments.

FIG. 4 shows an exemplary overall process for establishing, deploying, operating, and publishing virtual sensor network 130 consistent with disclosed embodiments. Steps of this process may be performed by server computer 150, by virtual sensor network 130/ECM 120, or by both. Computer 200 or, more particularly, processor 202 may perform the process either as server computer 150 or as virtual sensor network 130/ECM 120.

As shown in FIG. 4, at the beginning of the overall process, processor 202 may obtain virtual sensor network project data (step 402). Virtual sensor network project data may refer to any data associated with establishing, operating, and publishing a virtual sensor network, such as virtual sensor network 130. For example, the project data may include identification data, virtual sensor types and specifications, complying standards, deployment target information for the virtual sensors in the virtual sensor network, and data related to calibration and publication of the virtual sensor network. The project data may also include any metadata associated with the virtual sensor network. Processor 202 may obtain the project data from a user input, from an external computer system, or from a database, such as database 206.

Processor 202 may also obtain data records for creating virtual sensor models 304 (step 404). The data records may include any appropriate data records used to train, test, and validate individual virtual sensor models. For example, the data records may include information characterizing engine operations and emission levels including $NO_x$ emission levels, soot emission levels, and/or HC emission levels. Physical sensors (not shown) may be provided to generate data records on output parameters 320 (e.g., sensing parameters such as $NO_x$ emission levels, soot emission levels, and/or HC emission levels).

Processor 202 may also obtain data records on input parameters 310 (e.g., measured parameters, such as fuel rate, injection timing, intake manifold pressure, intake manifold temperature, intake valve actuation (IVA) end of current, injection pressure, engine speed, and certain delayed parameters). Further, the data records may include both input parameters 310 and output parameters 320 and may be collected based on various engines or based on a single test engine, under various predetermined operational conditions. In certain embodiments, operational conditions such as engine transient operations may also be used to collect data records of input parameters 310 and output parameters 320.

The data records may also be collected from experiments designed for collecting such data. Alternatively, the data records may be generated artificially by other related processes, such as other emission modeling or analysis processes. The data records may also include training data used to build virtual sensor models 304 and testing data used to validate virtual sensor models 304. In addition, the data records may also include simulation data used to observe and optimize virtual sensor models 304.

The data records may reflect characteristics of input parameters 310 and output parameters 320, such as statistical distributions, normal ranges, and/or precision tolerances, etc. After obtaining the data records (step 404), processor 202 may pre-process the data records to clean up the data records for obvious errors and to eliminate redundancies (step 406).

For example, processor 202 may remove approximately identical data records and/or remove data records that are out of a reasonable range in order to be meaningful for model generation and optimization. Processor 202 may also perform certain mathematical transform to process the data to be more suitable for building sensor models, such as trigonometric functions, logarithmic functions, and/or exponential functions. Further, methods for determining similarity may include clustering algorithms. Additionally, some data streams may be offset in time relative to the desired output to be modeled by virtual sensor models 304. In this case, a time-series correlation study may be performed on the candidate inputs to identify optimal time lags in the data records. The data stream can then be adjusted during the preprocessing stage to simplify virtual sensor models 304.

Figure 5:
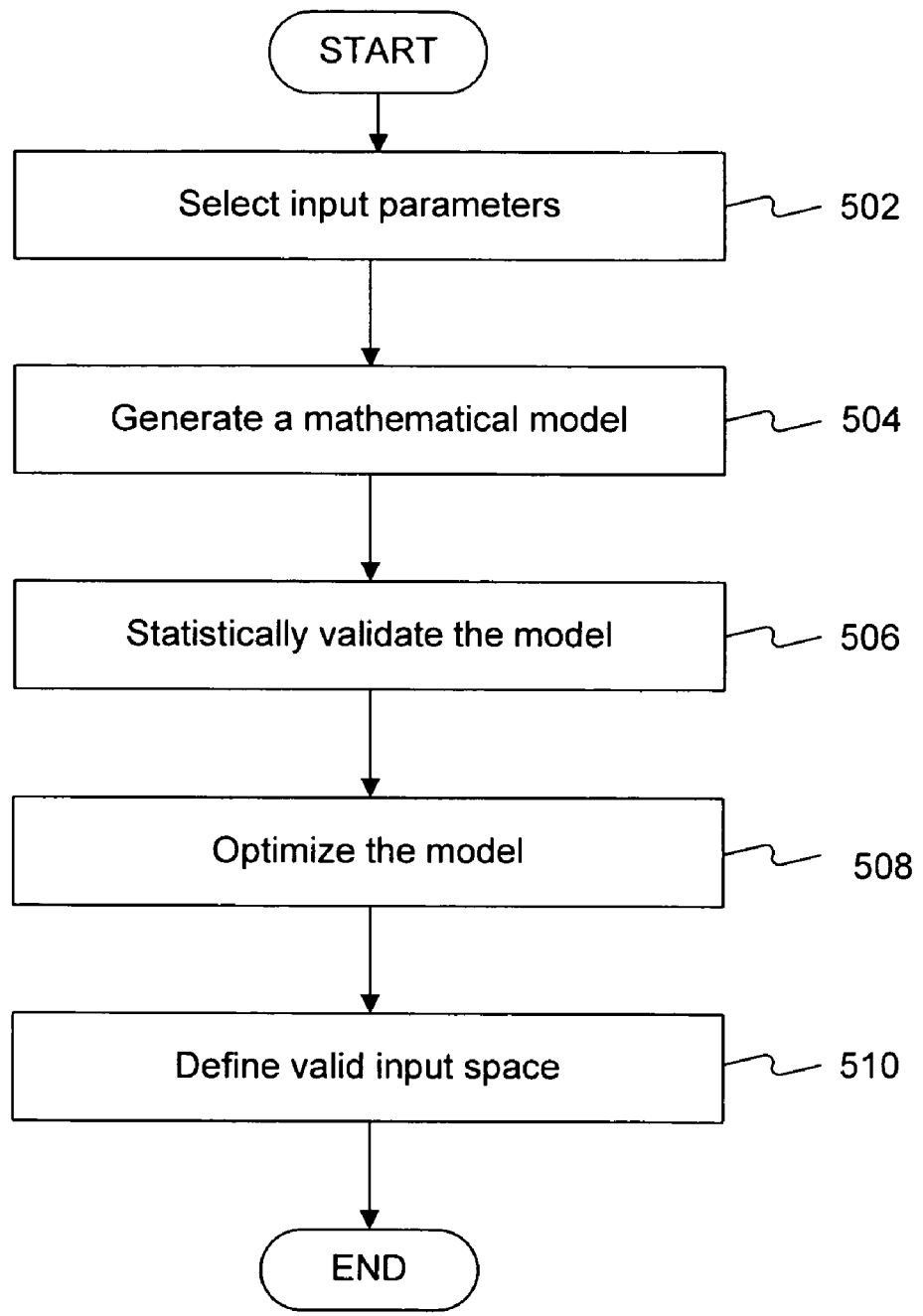
FIG. 5 illustrates a flowchart diagram of an exemplary virtual sensor model generation and optimization process consistent with certain disclosed embodiments.

Processor 202 may establish a virtual sensor network model including a plurality of virtual sensors (step 408). Processor 202 may create the individual virtual sensors 304 before establishing or operating virtual sensor network 130. FIG. 5 shows an exemplary model generation and optimization process performed by processor 202 to establish a virtual sensor, such as virtual sensor 330.

As shown in FIG. 5, processor 202 may select proper input parameters by analyzing the data records to create virtual sensor 330 (step 502). The data records may be associated with many input variables, such as variables corresponding to fuel rate, injection timing, intake manifold pressure, intake manifold temperature, IVA end of current, injection pressure, and engine speed, and other variables that are not corresponding to above listed parameters, such as torque, acceleration, etc. The number of input variables may be greater than the number of a particular set of input parameters 310 used for virtual sensor model 334. That is, input parameters 310 may be a subset of the input variables, and only selected input variables may be included in input parameters 310. For example, input parameter 310 may include fuel rate, injection timing, intake manifold pressure, intake manifold temperature, IVA end of current, injection pressure, and engine speed, of the input variables.

A large number of input variables may significantly increase computational time during generation and operation of the mathematical models. The number of the input variables may need to be reduced to create mathematical models within practical computational time limits. That is, input parameters 310 may be selected from the input variables such that virtual sensor model 334 may be operated with a desired speed or efficiency. Additionally, in certain situations, the number of input variables in the data records may exceed the number of the data records and may lead to sparse data scenarios. Some of the extra input variables may have to be omitted in certain mathematical models such that practical mathematical models may be created based on a reduced variable number.

Processor 202 may select input parameters 310 from the input variables according to predetermined criteria. For example, processor 202 may choose input parameters 310 by experimentation and/or expert opinions. Alternatively, in certain embodiments, processor 202 may select input parameters based on a Mahalanobis distance between a normal or reference data set and an abnormal or variant data set of the data records. The normal data set and abnormal data set may be defined by processor 202 using any appropriate method. For example, the normal data set may include characteristic data associated with input parameters 310 that produce desired values of output parameters 320. On the other hand, the abnormal data set may include any characteristic data that may be out of tolerance or may need to be avoided. The normal data set and abnormal data set may be predefined by processor 202.

Mahalanobis distance refers to a mathematical representation that may be used to measure data profiles based on correlations between parameters in a data set. Mahalanobis distance differs from Euclidean distance in that Mahalanobis distance takes into account the correlations of the data set. Mahalanobis distance of a data set X (e.g., a multivariate vector) may be represented as $$MD_i = (X_i - \mu_x)\Sigma^{-1}(X_i - \mu_x)' \quad (1)$$

where $\mu_x$ is the mean of X and $\Sigma^{-1}$ is an inverse variance-covariance matrix of X. $MD_i$ weights the distance of a data point $X_i$ from its mean $\mu_x$ such that data samples or data points that are on the same multivariate normal density contour will have the same distance. Such data samples or data points may be used to identify and select correlated parameters from separate data groups having different variances.

Processor 202 may select input parameters 310 as a desired subset of input variables such that the Mahalanobis distance between the normal data set and the abnormal data set is maximized or optimized. A genetic algorithm may be used by processor 202 to search input variables for the desired subset with the purpose of maximizing the Mahalanobis distance between the normal and abnormal data sets.

The genetic algorithm may be any appropriate type of genetic algorithm that may be used to find possible optimized solutions based on the principles of adopting evolutionary biology to computer science, such as chromosome, selection, mutation, reproduction operations, etc. Processor 202 may select a candidate subset of the input variables based on a predetermined criteria and calculate a Mahalanobis distance $MD_{normal}$ of the normal data set and a Mahalanobis distance $MD_{abnormal}$ of the abnormal data set. Processor 202 may also calculate the Mahalanobis distance between the normal data set and the abnormal data (i.e., the deviation of the Mahalanobis distance $MD_x = MD_{normal} - MD_{abnormal}$). Other types of deviations, however, may also be used.

Processor 202 may select the candidate subset of input variables if the genetic algorithm converges (i.e., the genetic algorithm finds the maximized or optimized Mahalanobis distance between the normal data set and the abnormal data set corresponding to the candidate subset). If the genetic algorithm does not converge, a different candidate subset of input variables may be created for further searching. This searching process may continue until the genetic algorithm converges and a desired subset of input variables (e.g., input parameters 310) is selected.

Optionally, Mahalanobis distance may also be used to reduce the number of data records by choosing a subset of data records that achieve a desired difference in Mahalanobis distance, as explained above.

After selecting input parameters 310 (e.g., fuel rate, injection timing, intake manifold pressure, intake manifold temperature, IVA end of current, injection pressure, and engine speed), processor 202 may generate a mathematical model (e.g., virtual sensor model 334) to build interrelationships between input parameters 310 and output parameters 320 (step 504). In certain embodiments, virtual sensor model 334 may correspond to a computational model built on any appropriate type of neural network.

The type of neural network computational model used may include any appropriate type of neural network model. For example, a feed forward neural network model may be included to establish virtual sensor model 334. Other types of neural network models, such as back propagation, cascaded neural networks, and/or hybrid neural networks, may also be used. Categorical neural networks, such as the ARTMAP or SOMNET, may also be used. Particular types or structures of the neural network used may depend on particular applications. Although neural network models are illustrated, other types of computational models, such as linear system or non-linear system models, decision trees, etc., may also be used.

The neural network computational model (i.e., virtual sensor model 334) may be trained by using selected data records. For example, the neural network computational model may include a relationship between output parameters 320 (e.g., $NO_x$ emission level, soot emission level, and/or HC emission level) and input parameters 310 (e.g., fuel rate, injection timing, intake manifold pressure, intake manifold temperature, IVA end of current, injection pressure, and engine speed). The neural network computational model may be evaluated by predetermined criteria to determine whether the training is completed. The criteria may include desired ranges of accuracy, time, and/or number of training iterations.

After the neural network has been trained (i.e., the computational model has initially been established based on the predetermined criteria), processor 202 may statistically validate the computational model (step 506). Statistical validation may refer to an analyzing process to compare outputs of the neural network computational model with actual or expected outputs to determine the accuracy of the computational model. Part of the data records may be reserved for use in the validation process.

Alternatively, processor 202 may also generate simulation or validation data for use in the validation process. This may be performed either independently of a validation sample or in conjunction with the sample. Statistical distributions of inputs may be determined from the data records used for modeling. A statistical simulation, such as Latin Hypercube simulation, may be used to generate hypothetical input data records. These input data records are processed by the computational model, resulting in one or more distributions of output characteristics. The distributions of the output characteristics from the computational model may be compared to distributions of output characteristics observed in a population. Statistical quality tests may be performed on the output distributions of the computational model and the observed output distributions to ensure model integrity.

Once trained and validated, virtual sensor model 334 may be used to predict values of output parameters 320 when provided with values of input parameters 310. Further, processor 202 may optimize virtual sensor model 334 by determining desired distributions of input parameters 310 based on relationships between input parameters 310 and desired distributions of output parameters 320 (step 508).

Processor 202 may analyze the relationships between desired distributions of input parameters 310 and desired distributions of output parameters 320 based on particular applications. For example, processor 202 may select desired ranges for output parameters 320 (e.g., $NO_x$ emission level, soot emission level, or HC emission level that is desired or within a certain predetermined range). Processor 202 may then run a simulation of the computational model to find a desired statistical distribution for an individual input parameter 310 (e.g., one of fuel rate, injection timing, intake manifold pressure, intake manifold temperature, IVA end of current, injection pressure, engine speed, and certain delayed parameters). That is, processor 202 may separately determine a distribution (e.g., mean, standard variation, etc.) of the individual input parameter corresponding to the normal ranges of output parameters 320. After determining respective distributions for all individual input parameters, processor 202 may combine the desired distributions for all the individual input parameters to determine desired distributions and characteristics for overall input parameters 310.

Alternatively, processor 202 may identify desired distributions of input parameters 310 simultaneously to maximize the possibility of obtaining desired outcomes. In certain embodiments, processor 202 may simultaneously determine desired distributions of input parameters 310 based on the zeta statistic. Zeta statistic may indicate a relationship between input parameters, their value ranges, and desired outcomes. Zeta statistic may be represented as $$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

where $\bar{x}_i$ represents the mean or expected value of an ith input; $\bar{x}_j$ represents the mean or expected value of a jth outcome; $\sigma_i$ represents the standard deviation of the ith input; $\sigma_j$ represents the standard deviation of the jth outcome; and $|S_{ij}|$ represents the partial derivative or sensitivity of the jth outcome to the ith input.

Under certain circumstances, $\bar{x}_i$ may be less than or equal to zero. A value of 3 $\sigma_i$ may be added to $\bar{x}_i$ to correct such a problematic condition. If, however, $\bar{x}_i$ is still equal to zero even after adding the value of 3 $\sigma_i$, processor 202 may determine that $\sigma_i$ may also be zero, and that the model under optimization may be undesired. In certain embodiments, processor 202 may set a minimum threshold for $\sigma_i$ to ensure reliability of models. Under certain other circumstances, $\sigma_j$ may be equal to zero. Processor 202 may then determine that the model under optimization may be insufficient to reflect output parameters within a certain range of uncertainty. Processor 202 may assign an indefinite large number to $\zeta$.

Processor 202 may identify a desired distribution of input parameters 310 such that the zeta statistic of the neural network computational model (i.e., virtual sensor model 334) is maximized or optimized. An appropriate type of genetic algorithm may be used by processor 202 to search the desired distribution of input parameters 310 for the purpose of maximizing the zeta statistic. Processor 202 may select a candidate set of values of input parameters 310 with predetermined search ranges and run a simulation of virtual sensor model 334 to calculate the zeta statistic parameters based on input parameters 310, output parameters 320, and the neural network computational model (e.g., virtual sensor model 334). Processor 202 may obtain $\bar{x}_i$ and $\sigma_i$ by analyzing the candidate set of values of input parameters 310, and obtain $\bar{x}_j$ and $\sigma_j$ by analyzing the outcomes of the simulation. Further, processor 202 may obtain $|S_{ij}|$ from the trained neural network as an indication of the impact of the ith input on the jth outcome.

Processor 202 may select the candidate set of values of input parameters 310 if the genetic algorithm converges (i.e., the genetic algorithm finds the maximized or optimized zeta statistic of virtual sensor model 334 corresponding to the candidate set values of input parameters 310). If the genetic algorithm does not converge, a different candidate set of values of input parameters 310 may be created by the genetic algorithm for further searching. This searching process may continue until the genetic algorithm converges and a desired set of values of input parameters 310 is identified. Processor 202 may further determine desired distributions (e.g., mean and standard deviations) of input parameters 310 based on the desired set of values of input parameters 310. Once the desired distributions are determined, processor 202 may define a valid input space that may include any input parameter within the desired distributions (step 510).

In one embodiment, statistical distributions of certain input parameters may be impossible or impractical to control. For example, an input parameter may be associated with a physical attribute of a device, such as a dimensional attribute of an engine part, or the input parameter may be associated with a constant variable within virtual sensor model 334 itself. These input parameters may be used in the zeta statistic calculations to search or identify desired distributions for other input parameters corresponding to constant values and/or statistical distributions of these input parameters.

Optionally, more than one virtual sensor model may be established. Multiple established virtual sensor models may be simulated by using any appropriate type of simulation method, such as statistical simulation. For example, around 150 models may be simulated. Output parameters 320 based on simulation of these multiple virtual sensor models may be compared to select a most-fit virtual sensor model or several most-fit virtual sensor models based on predetermined criteria, such as smallest variance with outputs from corresponding physical sensor. The selected most-fit virtual sensor model 334 may be used in virtual sensor network 130.

Processor 202 may create, train, and validate a plurality of virtual sensors (e.g., virtual sensor models 304), as virtual sensor network 130 may include a plurality of virtual sensor models. Processor 202 may integrate virtual sensor models 304 into a virtual sensor network model based on characteristics of individual virtual sensor models 304.

A virtual sensor model may require a certain amount of computational resource to be operational. For example, a virtual sensor model may need to be stored in a certain amount of memory. The program code and data of the virtual sensor model may be loaded into memory to be executed by a processor. And the execution of the virtual sensor model may require a certain amount of processing time of the processor. Other computational resources, such as I/O operations, display operations, etc., may also be required by the virtual sensor model.

The overall computational resources required by a virtual sensor model may be referred to as a footprint of the virtual sensor model. The size of the footprint, i.e., the overall amount of the required computational resources, may relate to the complexity of the virtual sensor model, the type of the virtual sensor model, and accuracy of the virtual sensor.

Figure 6:
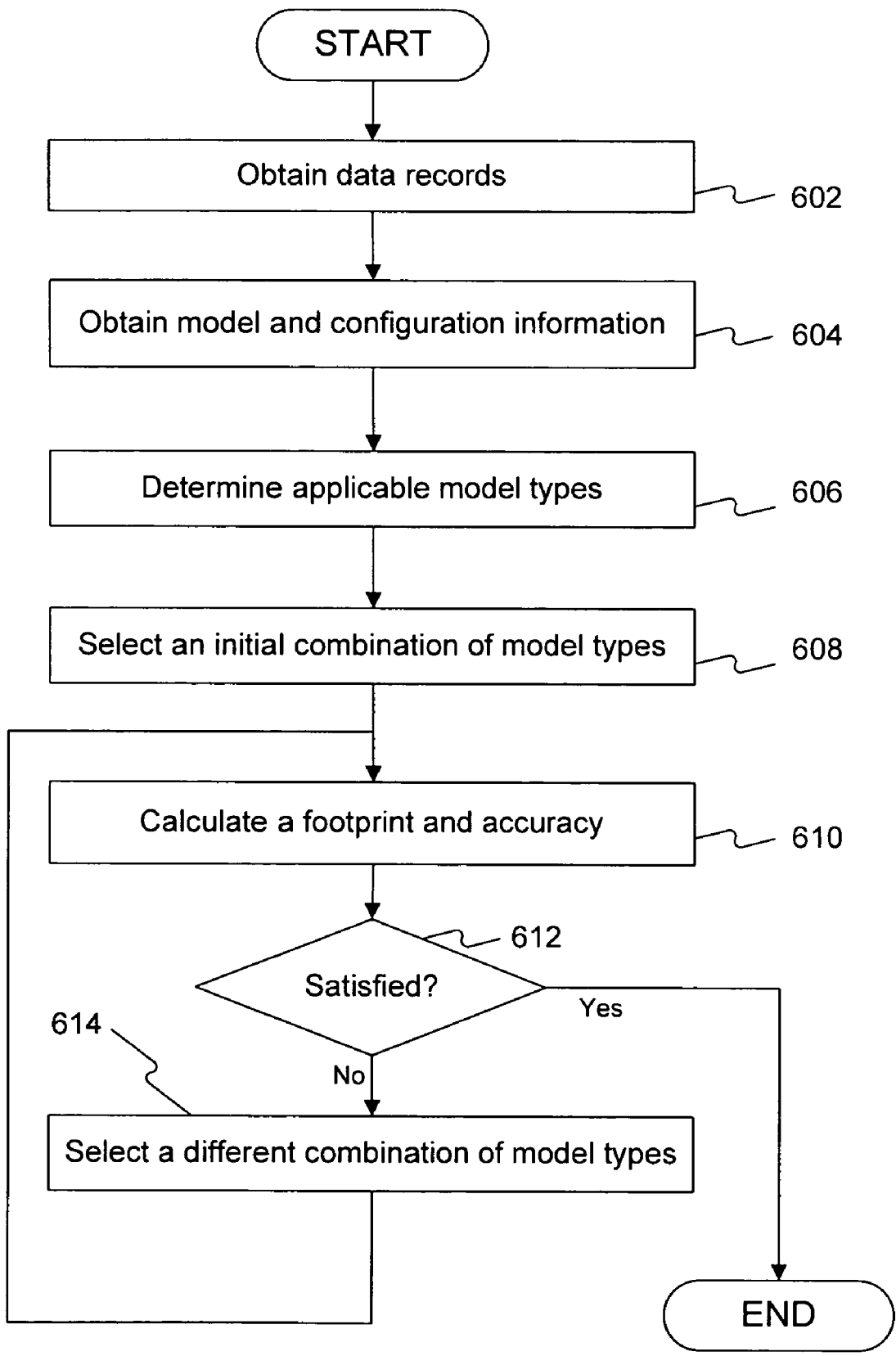
FIG. 6 illustrates a flowchart of an exemplary virtual sensor network integration process consistent with certain disclosed embodiments.

A footprint of a virtual sensor network may include footprints of all virtual sensors in the virtual sensor network plus a certain amount of computational resources required by certain virtual sensor network functionalities, such as control and validation functions. The plurality of virtual sensors may be integrated into virtual sensor models 304 of virtual sensor network system 130 by, for example, computer system 200 such that the footprint for virtual sensor network 130 may be desired or optimized. FIG. 6 shows an exemplary integration process.

As shown in FIG. 6, computer system 200, or processor 202, may obtain data records corresponding to a plurality of virtual sensors of virtual sensor network (step 602). The data records may include, for example, information characterizing engine operations and emission levels including $NO_x$ emission levels. ECM 120 and/or physical sensors 140 and 142, such as physical $NO_x$ emission sensors, may be provided to generate data records, such as intake manifold temperature, intake manifold pressure, ambient humidity, fuel rates, engine speeds, etc.

After obtaining the data records (step 602), processor 202 may obtain model and configuration information of virtual sensor models 304 (step 604). The model and configuration information may include any appropriate information to establish, configure, and control the plurality of virtual sensor models 304. For example, processor 202 may obtain model type information and structural information of the plurality of virtual sensor models 304.

A model type may refer to mathematical characteristics of a virtual sensor model. For example, a virtual sensor model type may include a decision tree model, a linear model, a nonlinear regression model, a linear multiple regression model, a time-lag model, and a neural network model.

A decision tree model may refer to a predictive model mapping from observations about an item to conclusions about its target value. The decision tree model may include a classification tree (discrete outcome) or regression tree (continuous outcome), where leaves may represent classifications and branches may represent conjunctions of features that lead to those classifications.

A linear model may be represented by $Y=X\beta+\epsilon$, where n and p are integers and Y is an n×1 column vector of random variables, X is an n×p matrix of "known" (i.e. observable and non-random) quantities, whose rows correspond to statistical units, $\beta$ is a p×1 vector of (unobservable) parameters, and $\epsilon$ is an n×1 vector of "errors", which are uncorrelated random variables each with expected value 0 and variance $\sigma^2$. The values of the parameters $\beta$ and $\sigma^2$ may be inferred using a method of maximum likelihood.

A nonlinear regression model may be represented by $y=b_1x^1+b_2x^2+ \ldots +b_nx^n+c$, where $b_1$-$b_n$ are the regression coefficients, representing the amount the dependent variable y changes when the corresponding independent changes 1 unit. The c is the constant corresponding to where the regression line intercepts the y axis, and representing the amount the dependent y will be when the independent variable is 0. A nonlinear regression model may be used to establish that an independent variable explains a proportion of the variance in a dependent variable at a significant level and the relative predictive importance of the independent variable with respect to certain nonlinear effects.

A linear multiple regression model may be represented by $y=b_1x_1+b_2x_2+ \ldots +b_nx_n+c$, where $b_1$-$b_n$ are the regression coefficients, representing the amount the dependent variable y changes when the corresponding independent variables $x_1 \ldots x_n$ change by 1 unit. The c is the constant corresponding to where the regression line intercepts the y axis, and representing the amount the dependent y will be when all the independent variables are 0. A multiple regression model may be used to establish that a set of independent variables explains a proportion of the variance in a dependent variable at a significant level and the relative predictive importance of the independent variables. Nonlinear multiple regression models can be constructed in similar fashion by applying various or multiple exponential characteristics to independent variables specified.

A time-lag model may refer to any appropriate linear or nonlinear model with a certain time lag applied to the independent variables. For instance, a simple linear model of the form y=mx+b can be transformed to a time-lagged linear model of the form $y_t=mx_{t-n}+b$ where t represents time, and n represents a desired number of lags of x in time prior to t to produce the desired estimated of y at the current time.

Further, a neural network model may refer to an interconnected group of artificial neurons (i.e., a simple processing element) that uses a mathematical or computational model for information processing based on a connectionist approach to computation. The neural network may be an adaptive system that changes its structure based on external or internal information that flows through the network. Any type of neural network models may be used. It is understood that the above model types are listed for exemplary purposes.

Structural information of a virtual sensor model may be used by processor 202 to change a model type of the virtual sensor model. For example, processor 202 may change a virtual sensor model from a linear model to a neural network model. The different models corresponding to different model types may be created in real-time based on the structural information, or may be pre-established.

Processor 202 may also determine applicable model types supported by each virtual sensor model (step 606). For example, for a particular virtual sensor model, processor 202 may determine different types of models upon which the virtual sensor can be built. The models of different types may be pre-established or may be established by processor 202 in real-time.

Processor 202 may select an initial combination of model types for virtual sensor models 304 (step 608). For each of a plurality of the virtual sensor models 304, processor 202 may select an initial model type. For example, processor 202 may select a neural network model for an emission virtual sensor, and may select a linear model for a temperature virtual sensor. Any appropriate combination of different or same types may be used.

After selecting the model type (step 608), processor 202 may calculate a footprint and accuracy of virtual sensor models 304 (step 610). Processor 202 may calculate an individual footprint and accuracy of each of the virtual sensor models 304, and then calculate an overall footprint and accuracies of the virtual sensor models 304 based on individual footprints and accuracies. The footprint may increase in a sequential order for decision tree model type, linear model type, nonlinear regression model type, linear multiple regression model type, time-lag linear model type, and neural network model type. Accuracy may depend upon a particular application, and may increase in a sequential order for the decision tree model type, linear model type, nonlinear regression model type, linear multiple regression model type, time-lag linear model type, and neural network model type. Accuracy criteria may also include information about average absolute uncertainty, maximum absolute uncertainty, correlation, the number of data points in a test set that are within the uncertainty boundary of the model and the reference data points used to train the model, root-mean-square (RMS) error or other statistical measurements.

Further, processor 202 may determine whether the footprint and accuracy satisfy certain criteria or algorithms (step 612). The criteria or algorithms may be determined based upon a particular application (e.g., an engine application). For example, processor 202 may set a limitation for the overall footprint while maintaining a threshold for the overall accuracy or any individual accuracy such that a desired combination of model types may have an overall footprint under the limitation and an accuracy above the threshold. Other criteria or algorithms may also be used.

If processor 202 determines that the footprint and accuracy of virtual sensor models 304 do not satisfy the criteria (step 612; no), processor 202 may select a different combination of model types for virtual sensor models 304 (step 614). Processor 202 may select the different combination using any appropriate algorithm.

For example, processor 202 may use a genetic algorithm to select the different combination. This selecting process may continue until the genetic algorithm converges and the desired combination of model types and accuracy of virtual sensor models 304 is selected. Other algorithms, such as any progressive searching algorithm, may also be used.

On the other hand, if processor 202 determines that the footprint and accuracy satisfy the criteria (step 612; yes), processor 202 may complete the integration process and may output the desired combination model types to other control systems or users. This selecting process may be a progressive process. That is, the desired combination of model types of virtual sensor models 304 is obtained by progressively searching the various different combinations of model types of virtual sensor models 304. The desired combination of models along with other model information, such as model structures, model data, valid input spaces (i.e., valid input ranges) and output spaces (i.e., valid output ranges), calibration data, and/or other statistical data may be stored in memory or a database for operating and controlling virtual sensor models 304.

Returning to FIG. 4, after establishing and converting individual virtual sensor models 304 and integrating individual virtual sensor models 304 (step 408), processor 202 may deploy integrated virtual sensor network models 304 into virtual sensor network 130/ECM 120 (step 410). Processor 202 may deploy integrated virtual sensor models 304 based on deployment data from the virtual sensor network project data to one or more deployment targets, which refers to a particular operating format, a computing platform, and/or a program language. For example, processor 202 may deploy virtual sensor models 304 as fixed-point components, as floating-point components, as Java code blocks, as C++ code blocks, or as visual basic (VB) code blocks, etc. Other deployment targets may also be used.

Figure 7:
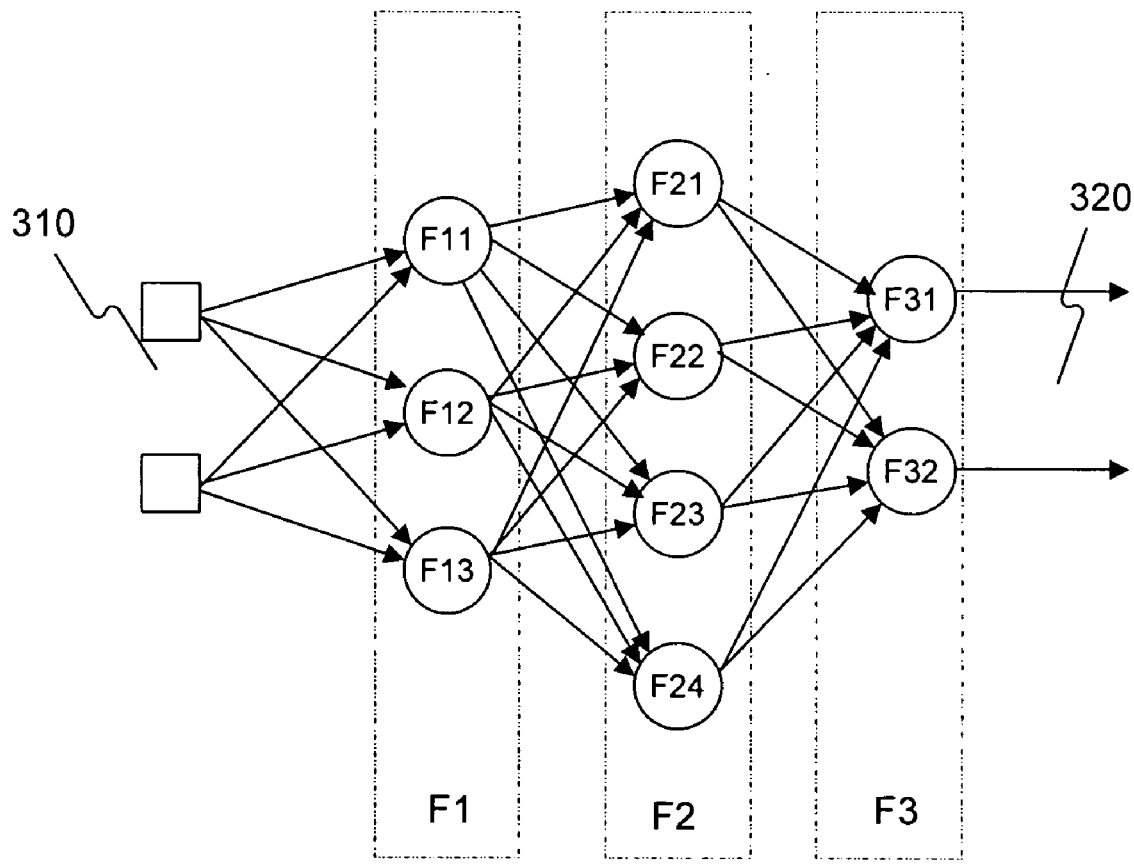
FIG. 7 illustrates an exemplary neural network model of a virtual sensor consistent with certain disclosed embodiments.

In certain embodiments, a virtual sensor model of virtual sensor models 304, for example, virtual sensor model 334, may be a neural network model and may be trained, validated, optimized, and/or selected with floating-point representation or double-precision floating-point representation, virtual sensor model 334 may then be converted into fixed-point representation to be loaded into ECM 120/virtual sensor network 130 for fixed-point operation. FIG. 7 shows an exemplary neural network model (e.g., virtual sensor model 334) of an individual virtual sensor (e.g., virtual sensor 330).

As shown in FIG. 7, virtual sensor model 334 may include a plurality of neural network layers. Each neural network layer may include one or more neural nodes (i.e., neuron or processing unit). For example, virtual sensor model 334 may include neural network layers F1, F2, and F3. Neural network layer F1 may include neural nodes F11, F12, and F13; neural network layer F2 may include neural nodes F21, F22, F23, and F24; and neural network layer F3 may include neural nodes F31 and F32. The number of layers or neural nodes in FIG. 7 is used for exemplary purpose only. The actual number of layers or neural nodes may depend upon particular applications.

The neural nodes from different neural network layers may be coupled between each other over a large number of connections, and each connection may be defined by a weight. Each neural node may also have an activation function, which may produce an output (i.e., a state of the activation) based on an input or a plurality of inputs provided to the neural node. A neural node may also propagate the output to other neural nodes and/or adjust corresponding weights of related connections. Further, a neural network layer may include one or more neural nodes in a parallel configuration. Although FIG. 7 shows a feed-forward neural network, any type of neural network, such as back propagation or hybrid neural network, may also be used.

Figure 8:
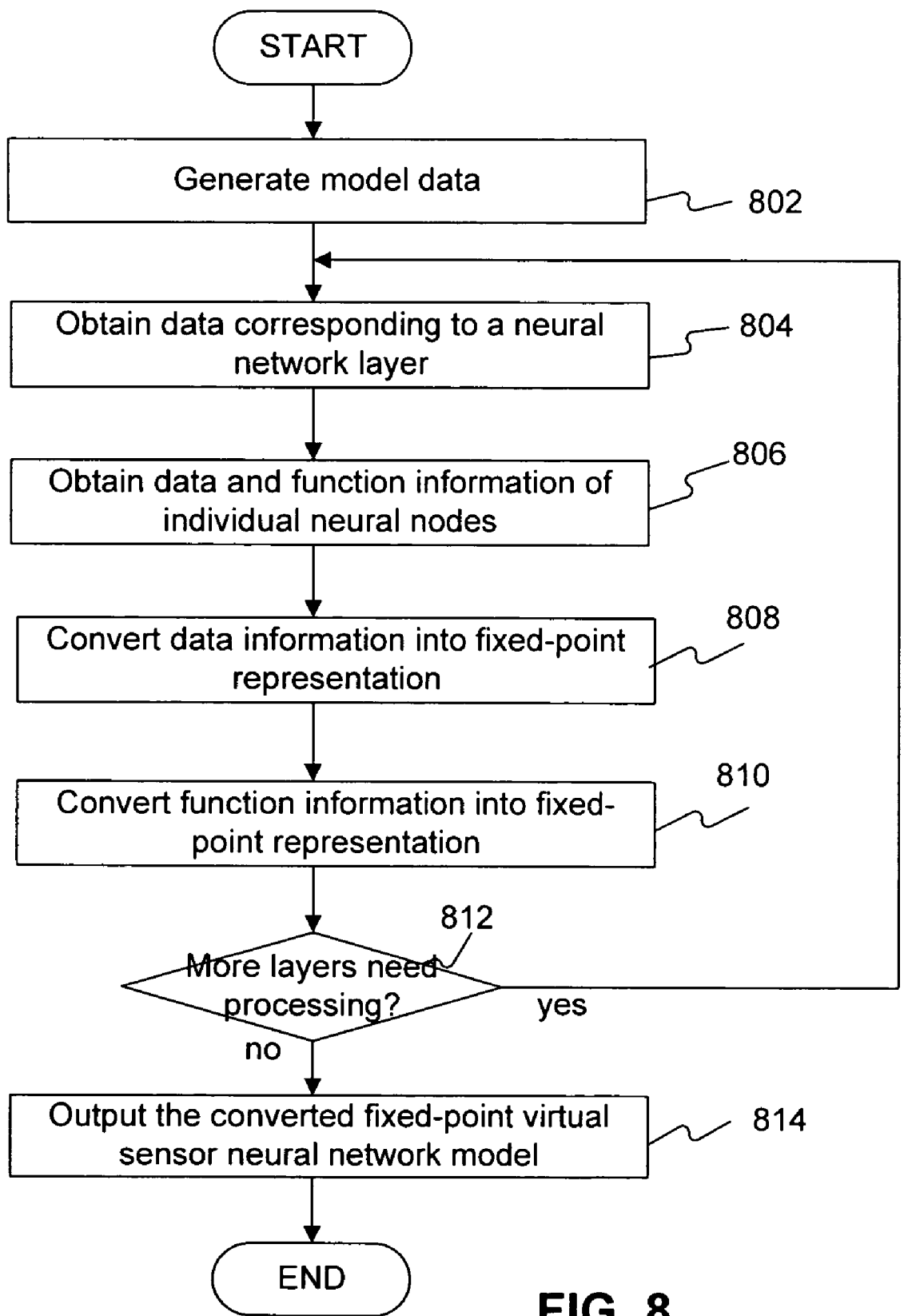
FIG. 8 illustrates a flowchart of an exemplary conversion process consistent with certain disclosed embodiments.

Processor 202 may convert virtual sensor model 334 from floating-point representation (e.g., single or double precision floating-point representation) into fixed-point representation. That is, processor 202 may convert data and/or functions associated with virtual sensor model 334 into fixed-point representation such that operation of virtual sensor model 334 may be carried out in fixed-point representation by ECM 120. FIG. 8 shows a flowchart diagram of an exemplary conversion process.

As shown in FIG. 8, processor 202 may generate model data corresponding to virtual sensor model 334 (step 802). The model data may include any appropriate data associated with virtual sensor model 334. For example, the model data may include name, type, storage location, input and output parameters, the number of neural network layers, identifiers of the neural network layers, and information of all neural nodes, such as weights, activation function types, ranges of inputs to the activation functions, and gains and offsets of the activation function. Other model data, however, may also be included.

Processor 202 may generate the model data during the processes of training, validating, and optimizing virtual sensor model 334, as explained above, and may store such model data in storage medium, such as database 206. After generating the model data (step 802), processor 202 may obtain data corresponding to a neural network layer for conversion (step 804). That is, processor 202 may convert virtual sensor model 334 layer by layer. Other sequences of conversion, however, may also be used.

For example, processor 202 may read data corresponding to neural network layer F1, such as layer name, type, number of neural nodes, and/or neural node information. From the data corresponding to a neural network layer, processor 202 may obtain data and function information of individual neural nodes included in the neural network layer (step 806). For example, processor 202 may obtain data and function information of F11, F12, and F13 of neural network layer F1.

Further, processor 202 may convert data information of the individual neural nodes into fixed-point representation (step 808). For example, data (e.g., numbers) representing weights of connections between neural nodes, gains and offsets of activation functions of the neural nodes may be converted into fixed-point representation. Processor 202 may determine a fixed-point data type for each number to be converted (e.g., weight, gain, or offset of each neural node).

A fixed-point data type of a number, as used herein, may refer to a specific format of binary bits representing the number, such as the number type (e.g., 2's complement signed or unsigned), word length and radix position (e.g., integer word length and fractional word length), truncation mode (e.g., round-off or truncation), and/or overflow mode (e.g., saturation or wrap-around). Processor 202 may determine a desired fixed-point data type for each number to be converted such that a proper fixed-point representation of the number may be created.

For example, a small number may be represented by a fixed-point data type with fewer integer bits but more fraction bits, while a large number may be represented by a fixed-point data type with more integer bits but fewer fraction bits. When the data information includes constant values associated with neural nodes of virtual sensor model 334, processor 202 may determine the fixed-point data type based on any appropriate criteria, such as the magnitude and sign of the number to be converted and allowed error margins (i.e., precision), and may convert the data information node by node.

In certain embodiments, as previously explained, processor 202 may determine the fixed-point representation based on the scaled integer (SI) data type. Processor 202 may calculate a total number of scaling unit (e.g., $2^{-10}$) to determine the size of the SI data type. Further, processor 202 may determine the scaling unit based on any appropriate criteria or may obtain the scaling unit information from memory module 204.

Figure 9:
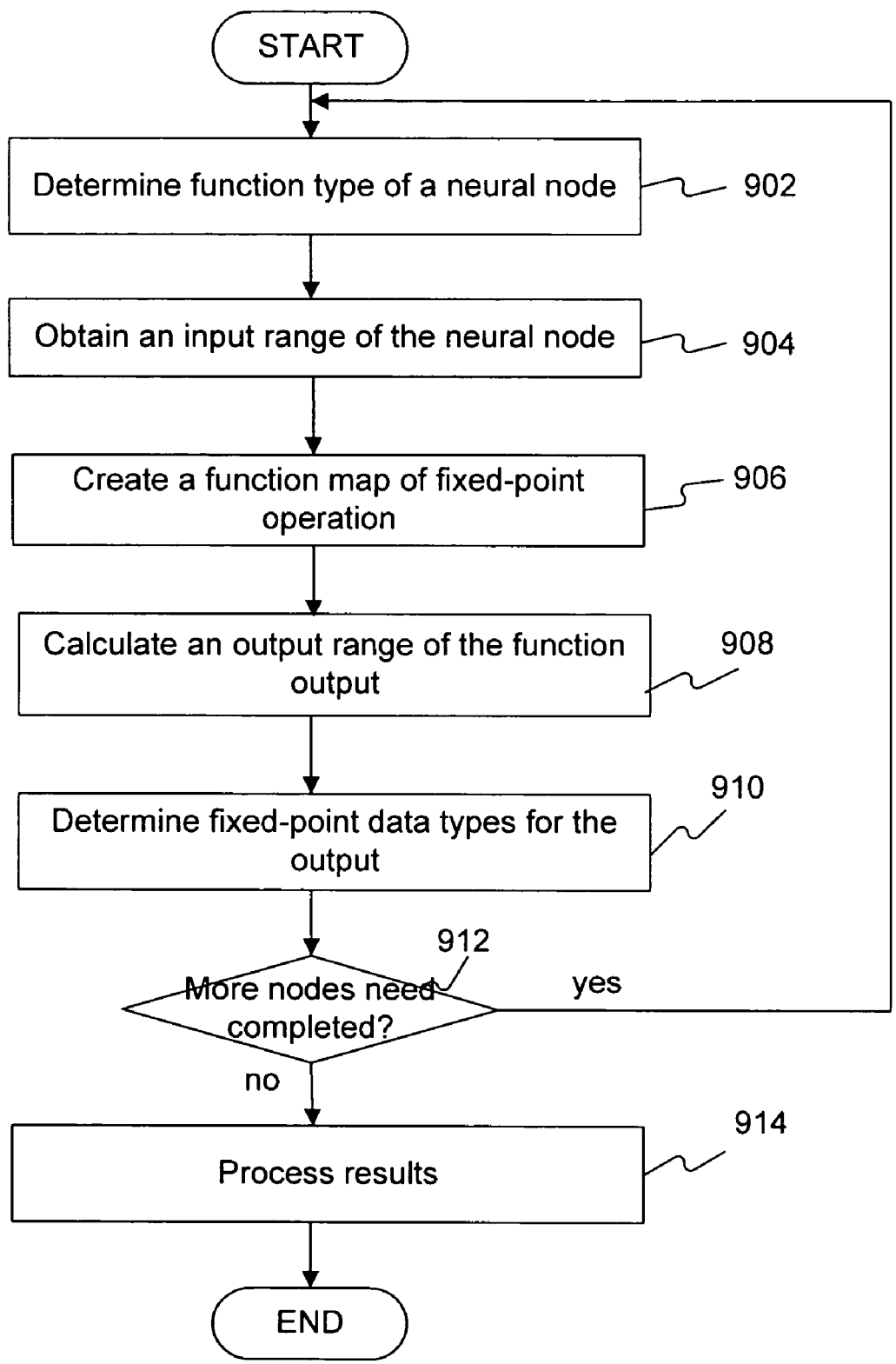
FIG. 9 illustrates a flowchart of an exemplary function conversion process consistent with certain disclosed embodiments.

Processor 202 may also convert function information of the individual neural nodes into fixed-point representation (step 810). The function information may include any appropriate information about activation functions of individual neural nodes, such as types, input and output relationships, and input and output ranges, etc. For example, processor 202 may convert activation functions of the individual neural nodes into fixed-point representation by performing a function conversion process. FIG. 9 shows a flowchart diagram of an exemplary function conversion process.

As shown in FIG. 9, processor 202 may determine a function type of a neural node (step 902). A plurality of activation function types may be used by a particular neural node. For example, the neural node may use an activation function of an identity function, which generates an output the same as an input; an exponential function, a hyperbolic tangent function, or a sigmoidal function. Other function types, however, may also be used. While any neural node may take on any activation function, neural nodes of a particular layer may share a common activation function type.

Processor 202 may obtain an input range of inputs to the neural mode (step 904). Processor 202 may obtain the input range from any appropriate source, such as model data. Further, processor 202 may create a fixed-point function map of the activation function for fixed-point operation (step 906). A function map, as used herein, may refer to any appropriate data structure, such as a table or an array, used to replace a substantial part of run-time computation with certain lookup operations, i.e., link an index input number to an output number. A fixed-point function map may refer to a function map that provides the output in fixed-point representation. In certain embodiments, the function map may also include an interpolation function for providing output values with an input value falling between two index input numbers. Other types of function maps may also be included.

Further, processor 202 may calculate an output range of the activation function (step 908). Processor 202 may calculate the output range of the activation function based on the type of the activation function and the input range. For example, for an identity-type activation function, processor 202 may calculate the output range of the activation function to be the same as the input range. For a hyperbolic type activation function or a sigmoidal type activation function, processor 202 may also calculate the output range of the activation function from the input range as modified by the limited output scope of the hyperbolic function or sigmoidal function. Further, for an exponential type activation function, processor 202 may calculate a maximum output value and a minimum output value based on the input range and the function map of the exponential activation function. Processor 202 may also use on interpolation operation to obtain linear approximation output values.

Processor 202 may determine fixed-point data types for outputs of the activation function (step 910). Processor 202 may determine a single fixed-point type for the entire range of the output of the activation function of a neural node, if the entire range can be represented by a fixed-point data type with a desired precision. Processor 202 may also determine a plurality of fixed-point types for different parts of the output range of the activation function of the neural node, if the entire range cannot be represented by a fixed-point data type with the desired precision. Processor 202 may also configure the function map such that a different part of an output range may be represented by a different fixed-point data type. Processor 202 may also determine fixed-point data types based on other criteria, such as a user input or data from other control systems (not shown) or computer programs.

Further, processor 202 may determine whether more neural nodes in the neural network layer have activation functions to be converted (step 912). If processor 202 determines that more neural nodes need to be converted (step 912; yes), processor 202 may continue the function conversion process from step 902. On the other hand, if processor 202 determines that no more neural nodes need to be converted (step 912; no), processor 202 may process results of the function conversion process (step 914). For example, processor 202 may store the results in a storage medium or a file, or may present the results to other control systems (not shown) or computer programs.

Returning to FIG. 8, after converting function information into fixed-point representation (step 810), processor 202 may determine whether more neural network layers need to be processed (step 812). If processor 202 determines that more neural network layers need to be processed (step 812; yes), processor 202 may continue the process from step 804. On the other hand, if processor 202 determines that no more neural network layers need to be processed (step 812; no), processor 202 may conclude virtual sensor model 334 is converted into fixed-point representation or a fixed-point virtual sensor neural network model, and may output the converted fixed-point virtual sensor neural network model (step 814).

For example, processor 202 may store the converted fixed-point representation of virtual sensor model 334 in a data file, and may output the data file to a code generator to generate fixed-point binary code to be executed on ECM 120/virtual sensor network 130. In certain embodiments, the converted fixed-point representation of virtual sensor model 334 may be directly loaded into ECM 120/virtual sensor network 130 to perform fixed-point virtual sensor operations.

ECM 120/virtual sensor network 130 may use fixed-point virtual sensor model 334 to perform various sensing functions at a desired computational performance level. For example, virtual sensor model 334 may calculate or predict $NO_x$ emission level, soot emission level, and/or HC emission level, and ECM 120 may control engine 110 according to the regulated emission levels provided by virtual sensor 330, and, in particular, by virtual sensor model 334.

Returning to FIG. 4, after deploying integrated virtual sensor models 304 into virtual sensor network 130/ECM 120 (step 410), processor 202 of virtual sensor network 130/ECM 120 may operate the integrated virtual sensor models 304 as the virtual sensor network via virtual network controller 306 (step 412).

Figure 10:
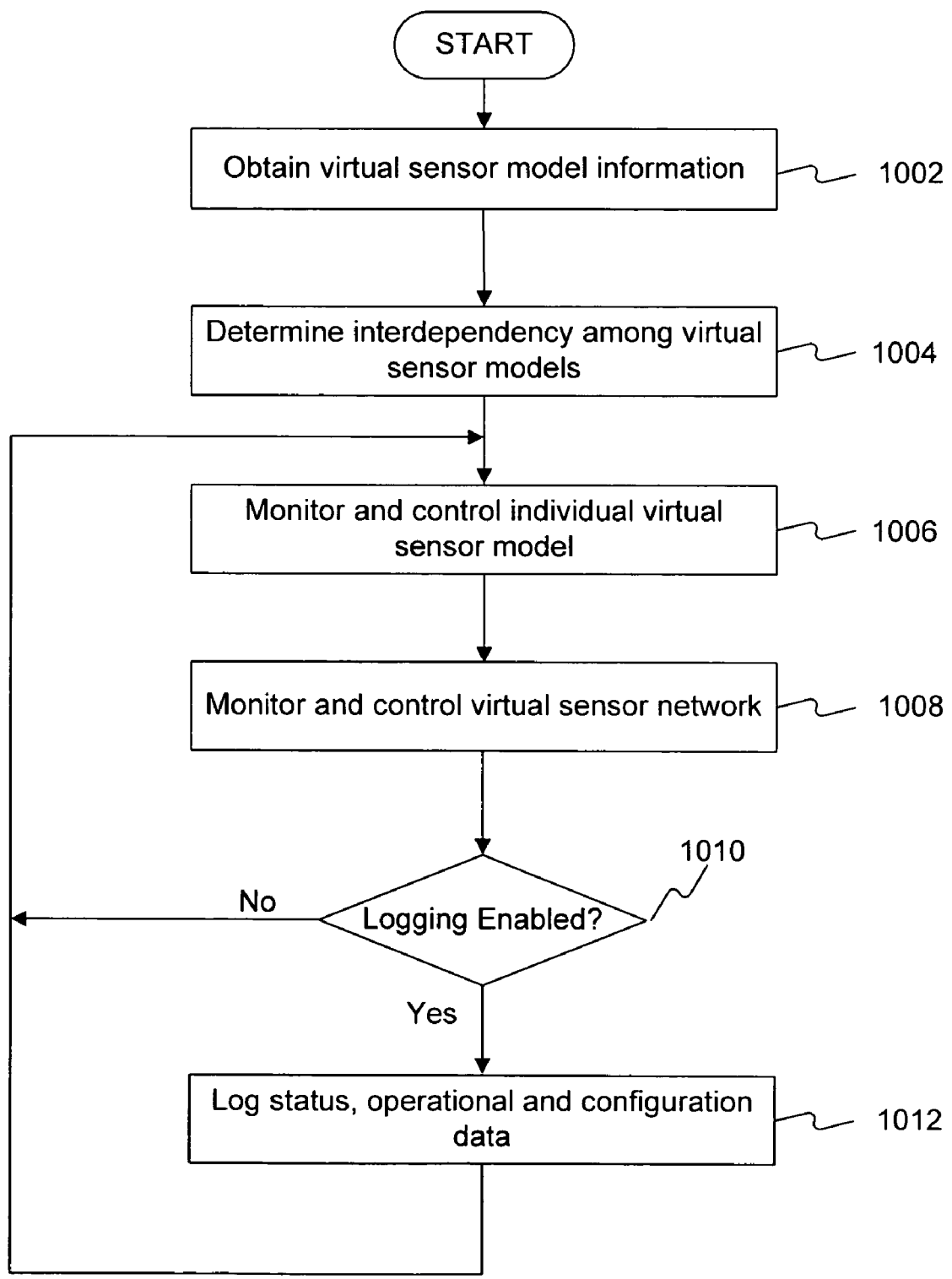
FIG. 10 illustrates a flowchart of an exemplary operation process consistent with certain disclosed embodiments.

In operation, virtual network controller 306 may monitor status of virtual sensor models 304 and corresponding physical sensors, determine fitness of individual virtual sensors of virtual sensor models 304, determine fitness of virtual sensor models 304 collectively, control operation of individual virtual sensors of virtual sensor models 304, report status to other computer programs or control systems, trace operations of virtual sensor network 130, and/or log various operational and configuration data. FIG. 10 shows an exemplary operation process performed by virtual sensor network controller 306 as implemented by computer system 200 or processor 202.

As shown in FIG. 10, processor 202 may obtain model information of a plurality of virtual sensors of virtual sensor models 304 (step 1002). For example, processor 202 may obtain model types, model structures, model data including valid input spaces and calibration data used to train and optimize the model, and statistical data, such as distributions of input and output parameters of the virtual sensor model. Processor 202 may also obtain operational data from physical sensors that provide data to or are modeled by virtual sensor models 304 via sensor input interface 302. For example, processor 202 may obtain values of input and output parameters of the physical sensors and operational status of the physical sensors.

Further, processor 202 may determine interdependency among the plurality of virtual sensor models based on the model information (step 1004). Interdependency, as used herein, may refer to any dependency between two or more virtual sensor models. For example, the interdependency between two virtual sensor models may refer to the existence of feedback from one virtual sensor model to the other virtual sensor model, either directly or indirectly. That is, one or more output parameters from one virtual sensor model may be directly or indirectly fed back to one or more input parameters of the other virtual sensor model.

Processor 202 may also create a table for storing the interdependency information among virtual sensor models 304. From the interdependency table, processor 202 may look up interdependent virtual sensor models for a particular virtual sensor model or any other interdependency information in real-time.

Processor 202 may also monitor and control individual virtual sensors (step 1006). For example, for a backup virtual sensor, i.e., a virtual sensor becomes operational upon a predetermined event to replace a corresponding physical sensor, processor 202 may obtain predicted values of output parameters of the backup virtual sensor model and actual values of output parameters of the corresponding physical sensor represented by the virtual sensor model. Processor 202 may calculate a deviation between the predicted values and the actual values and may determine whether the deviation is beyond a predetermined threshold. If processor 202 determines that a deviation between the predicted values and the actual values is beyond the predetermined threshold, processor 202 may operate the virtual sensor model to provide predicted output parameter values to other control systems, such as ECM 120, via sensor output interface 308.

Further, for any operational virtual sensor model, processor 202 may obtain values of input parameters and output parameters of the operational virtual sensor. Processor 202 may further determine whether any input parameter to the virtual sensor or any output parameter from the virtual sensor exceeds the range of a valid input space or a valid output space, respectively.

If processor 202 determines that any individual input parameter or output parameter is out of the respective range of the input space or output space, processor 202 may send out a notification to other computer programs, control systems, or a user of machine 100. Optionally, processor 202 may also apply any appropriate algorithm to maintain the values of input parameters or output parameters in the valid range to maintain operation with a reduced capacity.

Processor 202 may also determine collectively whether the values of input parameters are within a valid range. For example, processor 202 may use a Mahalanobis distance to determine normal operational condition of collections of input values.

During training and optimizing of virtual sensor models 304, a valid Mahalanobis distance range for the input space may be calculated and stored as calibration data associated with individual virtual sensor models. In operation, processor 202 may calculate a Mahalanobis distance for input parameters of a particular virtual sensor model as a validity metric of the valid range of the particular virtual sensor model. If the calculated Mahalanobis distance exceeds the range of the valid Mahalanobis distance range stored in virtual sensor network 130, processor 202 may send out a notification to other computer programs, control systems, or a user of machine 100 to indicate that the particular virtual sensor may be unfit to provide predicted values. Other validity metrics may also be used. For example, processor 202 may evaluate each input parameter against an established upper and lower bound of acceptable input parameter values and may perform a logical AND operation on a collection of evaluated input parameters to obtain an overall validity metric of the virtual sensor model.

After monitoring and controlling individual virtual sensors, virtual sensor network controller 306 (e.g., processor 202) may also monitor and control collectively a plurality of virtual sensor models (step 1008). That is, processor 202 may determine and control operational fitness of virtual sensor network 130. Processor 202 may monitor any operational virtual sensor model of virtual sensor models 304. Processor 202 may also determine whether there is any interdependency among any operational virtual sensor models including the virtual sensor models becoming operational. If processor 202 determines there is an interdependency between any virtual sensor models, processor 202 may determine that the interdependency between the virtual sensors may have created a closed loop to connect two or more virtual sensor models together, which may be neither intended nor tested. Processor 202 may then determine that virtual sensor network 130 may be unfit to make predictions, and may send a notification or report to control systems, such as ECM 120, or users of machine 100. That is, processor 202 may present other control systems or users the undesired condition via sensor output interface 308. Alternatively, processor 202 may indicate as unfit only the interdependent virtual sensors, while keeping the remaining virtual sensors in operation.

As used herein, a decision that a virtual sensor or a virtual sensor network is unfit is intended to include any instance in which any input parameter to or any output parameter from the virtual sensor or the virtual sensor network is beyond a valid range or is uncertain; or any operational condition that affects the predictability and/or stability of the virtual sensor or the virtual sensor network. An unfit virtual sensor network may continue to provide sensing data to other control systems using virtual sensors not affected by the unfit condition, such as interdependency, etc.

Processor 202 may also resolve unfit conditions resulting from unwanted interdependencies between active virtual sensor models by deactivating one or more models of lower priority than those remaining active virtual sensor models. For instance, if a first active virtual sensor model has a high priority for operation of machine 100 but has an unresolved interdependency with a second active virtual sensor having a low priority for operation of machine 100, the second virtual sensor model may be deactivated to preserve the integrity of the first active virtual sensor model.

Further, processor 202 may determine whether internal logging functionality is enabled or triggered (step 1010). As used herein, internal logging may refer to the virtual sensor network controller's recording information on status, configuration, and operational data associated with virtual sensor network 130. The internal logging may be enabled/disabled by a user or by server computer 150. The recorded logging data may be used to verify proper operation of virtual sensor network 130 and/or to trace certain or all operation of virtual sensor network 130. If processor 202 determines that the internal logging functionality is not enabled or triggered (step 1010; no), processor 202 may continue the operation process from step 1006.

On the other hand, if processor 202 determines that internal logging is enabled or triggered (step 1010; yes), processor 202 may log information on the status data, operational data, and configuration data (step 1012). Optionally, processor 202 may enable the internal logging if processor 202 determines that an individual virtual sensor model is unfit to make predictions or that virtual sensor network 130 is unfit to make predictions. Processor 202 may record the data internally and may transmit to an external computer system (e.g., server computer 150) for processing. Server computer 150 may receive the logged data for offline processing or real-time processing.

Figure 11:
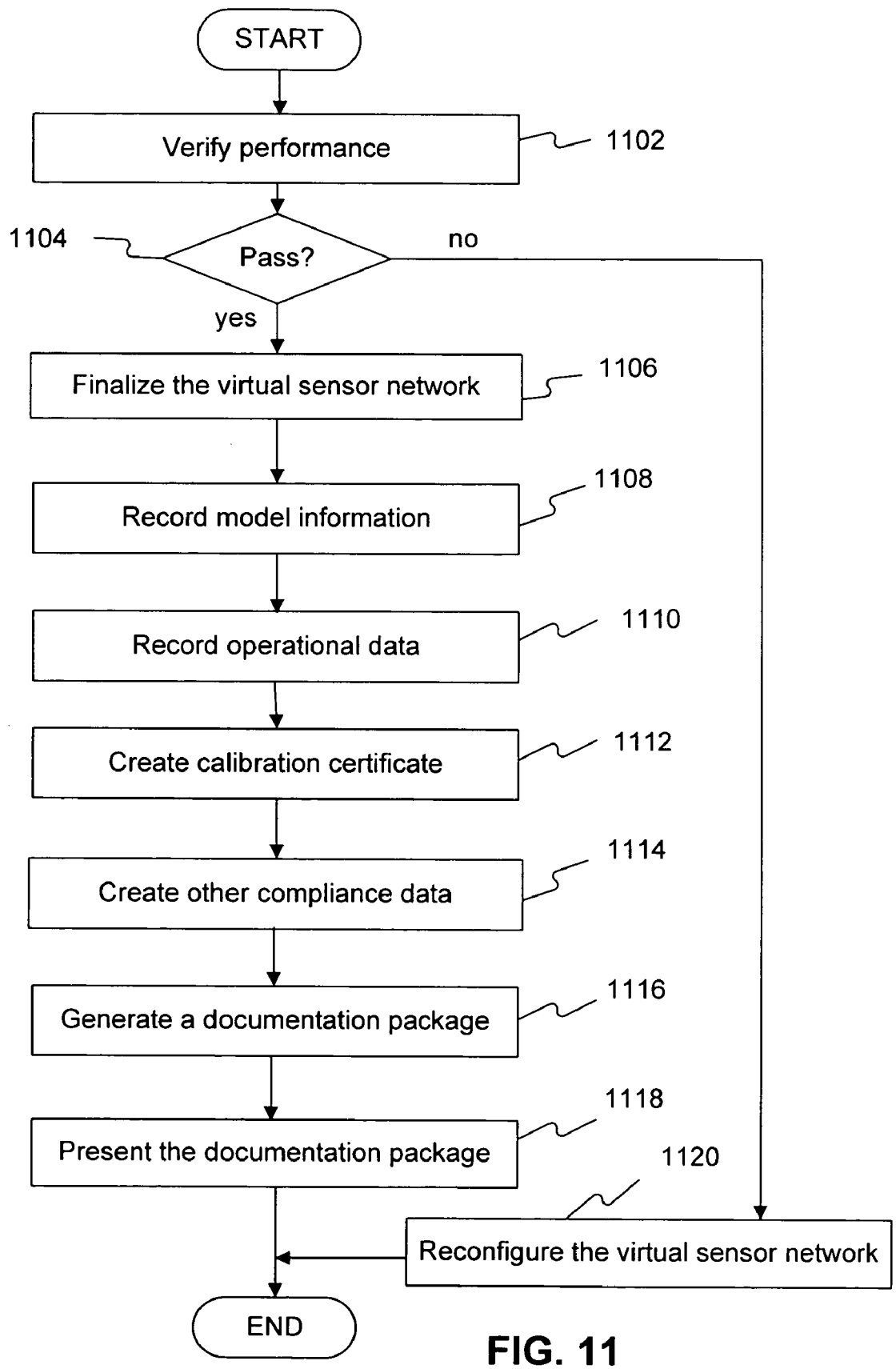
FIG. 11 illustrates a flowchart of an exemplary publishing process consistent with certain disclosed embodiments.

Returning to FIG. 4, after operating virtual sensor network 130 (step 412), processor 202 may publish virtual sensor network 130 (step 414). As used herein, publishing a virtual sensor network may refer to a series of steps for making the virtual sensor network publicly available, for complying with certain external standards, as defined by the virtual sensor network project data, for generating a documentation package, etc. Other steps, however, may also be included in the publishing process. FIG. 11 shows an exemplary publishing process performed by server computer 150 or, more particularly, processor 202 of computer system 200 implementing server computer 150.

As shown in FIG. 11, processor 202 may verify the performance of virtual sensor network 130 (step 1102). Processor 202 may communicate with virtual sensor network 130/ECM 120 to conduct a performance verification on virtual sensor network 130/ECM 120. Processor 202 may also conduct a performance verification based on logged data records from virtual sensor network 130/ECM 120.

Based on the performance verification, processor 202 may determine whether virtual sensor network 130 passes the performance verification (step 1104). Processor 202 may use one or more selected criteria to determine whether virtual sensor network 130 passes. For example, processor 202 may determine passage based on precision, speed, computational resources, stability, and/or repeatability of virtual sensor network 130. Other criteria may also be used. If processor 202 determines that virtual sensor network 130 does not pass the performance verification (step 1104; no), processor 202 may reconfigure virtual sensor network 130 or may cause virtual sensor network 130 to be reconfigured in real-time (step 1120). For example, processor 202 may re-select data records and re-establish one or more virtual sensor models 304, as described in steps 406 and 408. Processor 202 may also determine one or more new configuration and criteria for virtual sensor network 130, as described in steps 610, 612, and 614. Other methods, however, may also be used.

On the other hand, if processor 202 determines that virtual sensor network passes the performance test (step 1104; yes), processor 202 may finalize virtual sensor network 130 (step 1106). For example, processor 202 may assign a unique identifier to virtual sensor network 130, time stamp virtual sensor network 130, and/or fix configuration parameters and structures of virtual sensor network 130 (e.g., lock the configuration parameters and structures). The identifier, such as a serial number, and other information may be embedded in virtual sensor network 130.

Processor 202 may also record model information of virtual sensor network 130 (step 1108). For example, processor 202 may record model types, model structures, model constants and variables, model training, testing, and validating data, and/or model performance data, such as fixed-point conversion performance data, of virtual sensor models 304. Processor 202 may also record configuration information of virtual sensor network 130. Any appropriate data associated with virtual sensor network 130 and virtual sensor models 304 may be recorded.

Further, processor 202 may record operational data (step 1110). For example, processor 202 may record an operational trace of virtual sensor network 130. Processor 202 may select data from logged data to record operational and/or status data for virtual sensor network 130 such that the operation of virtual sensor network 130 may be later separately verified and/or tested.

Processor 202 may create one or more calibration certificates (step 1112). Processor 202 may create calibration certificates for virtual sensor network 130 and/or individual virtual sensor models 304. A calibration certificate, as used herein, may refer to any appropriate document containing calibration related information about a product (e.g., a hardware product, a software product, or a hardware/software product, etc.) including internal components of the product. The calibration information may include detailed measurement data versus a measurement specification of the product, proof of calibration for quality audits, traceability to national or international standards, proof of calibration performed according to certain standards, etc., of the product and/or of one or more internal component of the product. Other information, however, may also be included.

The detailed measurement data may include any appropriate data corresponding to measurement of operational parameters of the product. For example, the detailed measurement data of virtual sensor network 130 and/or individual virtual sensor models 304 may include normal operational ranges of input and/or output parameters, such as a valid input space and/or a valid output space. Further, the detailed measurement data of virtual sensor network 130 and/or individual virtual sensor models 304 may also include uncertainty of the measurement of virtual sensor network 130 and/or individual virtual sensor models 304.

Uncertainty, as used herein, may represent an approximation or estimate of the value of the measurement. The uncertainty may include a type A uncertainty, evaluated by statistical methods, and a type B uncertainty, evaluated by means other than statistical methods. The evaluation of uncertainty by the statistical analysis of a series of observations may be termed a Type A evaluation (of uncertainty); and the evaluation of uncertainty by means other than the statistical analysis of a series of observations may be termed a Type B evaluation (of uncertainty). Both Type A uncertainty and Type B uncertainty may be represented by an estimated standard deviation, i.e., standard uncertainty, from measurement results.

Type A uncertainty and Type B uncertainty may be combined according to a certain method. For example, a combined standard uncertainty may include a square root of the sum-of-the-squares of a Type A standard uncertainty and a Type B standard uncertainty. Optionally, the uncertainty may be characterized as one of uncertainty arising from a random effect and uncertainty arising from a systematic effect. A random effect may correspond to a possible random error in a current measurement process and a systematic effect may correspond to a possible systematic error in the current measurement process.

The calibration certificates may be created during manufacturing, testing, operating, or recalibration processes. In certain embodiments, processor 202 may create the calibration certificate based on the recorded data (e.g., the recorded model information and operational data, such as performance data). For example, processor 202 may select, from previously recorded data, model types, model structures, model data including valid input spaces and calibration data used to train and optimize the model, and statistical data, such as distributions of input and output parameters of the virtual sensor model, etc.

Processor 202 may also select operational data including interdependencies among individual virtual sensor models 304, as described previously. Further, processor 202 may also select performance information including desired and real-time ranges of input parameters and output parameters of virtual sensor network 130 and/or individual virtual sensor models 304, and/or frequencies and values of any deviation from normal ranges and/or unfit conditions, as explained previously. Other operational parameters, however, may also be included.

Processor 202 may select measurement data of virtual sensor network 130 and/or individual virtual sensor models 304, such as values of any appropriate operational parameters, and appropriate environment parameters while measuring operational parameters, such as measurement temperature, engine parameters, and/or virtual sensor network configuration parameters.

Processor 202 may calculate measurement ranges and uncertainty data to be included in the calibration certificate based on the measurement data, the performance information, and/or the model data. Processor 202 may calculate normal operation ranges for input parameters and output parameters of virtual sensor network 130 and/or individual virtual sensor models 304, and may also calculate normal ranges of environment parameters, based on certain statistical algorithms. Further, processor 202 may calculate uncertainty data of the measurement for virtual sensor network 130 and/or individual virtual sensor models 304.

The uncertainty of an output parameter may be inter-related to uncertainties of input parameters. For example, the uncertainty of the NOx emission level may be inter-related to uncertainties of fuel rate, injection timing, intake manifold pressure, intake manifold temperature, IVA end of current, injection pressure, engine speed, etc. Processor 202 may calculate uncertainties of input parameters and output parameters.

For example, processor 202 may calculate standard uncertainties from random effects in the measurement process and from systematic effects in the measurement process. Processor 202 may also calculate standard uncertainties from a Type A evaluation, a Type B evaluation, or both, for certain sources of uncertainty. The sources of uncertainty may include calibration, temperature, and operational and measurement environment, which may give rise to Type A and/or Type B uncertainties.

Processor 202 may calculate standard Type A uncertainty based on any appropriate statistical method. On the other hand, processor 202 may calculate standard Type B uncertainty based on certain non-statistical methods, such as methods based on previous measurement data, empirical data, specifications, other calibration data, and/or reference uncertainty data from handbooks. Other methods, however, may also be used.

Processor 202 may also derive uncertainties for a certain output parameter or for overall system from uncertainties of input parameters. That is, processor 202 may use uncertainties of input parameters as components of uncertainty contributing to the uncertainty of the measurement results of the output parameter or overall system.

Processor 202 may generate a calibration certificate for virtual sensor network 130 and/or corresponding calibration certificates for individual virtual sensor models 304 based on the documented measurement data, the performance information, the model data, and the measurement ranges and uncertainty data. For example, processor 202 may include in the calibration certificate the detailed measurement data including uncertainty data. Optionally, processor 202 may also include proof of calibration for quality audits, traceability to national or international standards, and proof of calibration performed according to certain standards, in the calibration certificate. As explained above, processor 202 may include sources of uncertainty for virtual sensor network 130 and/or corresponding calibration certificates for individual virtual sensor models 304 in the calibration certificate. More than one calibration certificates may be generated for virtual sensor network 130 and its internal components (e.g., individual virtual sensor models 304).

Further, for each source of uncertainty, processor 202 may include standard uncertainties from random effects (which may include both Type A evaluation uncertainty, Type B evaluation uncertainty, or both) and standard uncertainties from systematic effects (which may also include both Type A evaluation uncertainty, Type B evaluation uncertainty, or both). Other information, however, may also be included.

Processor 202 may also create other compliance data according the virtual sensor network project data (step 1114). Compliance data may include any appropriate information to certify compliance with a particular standard and to verify or audit such compliance. For example, processor 202 may create compliance data with standards from National Institute of Standards and Technologies (NIST), Environment Protection Agency (EPA) regulations, and/or other auditing requirements.

Further, processor 202 may automatically generate a documentation package (step 1116). A documentation package, as used herein, may refer to a collection of documents respectively documenting different aspects of virtual sensor network 130. Processor 202 may create the documentation package to include previously created data and/or documents, such as virtual sensor network project data, virtual sensor network identification number, such as serial number, date and time, virtual sensor network model information, operational data, any calibration certificate, and other compliance data. Processor 202 may use any appropriate format to organize the documentation package, and may also certify and date the documentation package. Processor 202 may also present the documentation package to a user or to an external computer system (step 1118). The user or the external computer system may search the documentation package to get the identification number or serial number; to get configuration parameters and configuration data such that the virtual sensor network may be operated stably and repeatably; and/or to get the calibration certificate to perform verification or auditing.

Returning to FIG. 4, after processor 202 publishes the virtual sensor network (step 414), the virtual sensor network may become a publicly available, stable, repeatable, verifiable, and auditable virtual sensor network device or component, with complete documentation associated with the virtual sensor network.

INDUSTRIAL APPLICABILITY

The disclosed systems and methods may provide an efficient and accurate solution for providing a plurality of virtual sensors within a single machine. The plurality of virtual sensors are aware of each other such that interdependency among the plurality of virtual sensors can be avoided. Fitness of an individual virtual sensor model and fitness of a collection of virtual sensor models may be obtained in real-time to facilitate control systems making proper decisions corresponding to the stability of the virtual sensor network.

The disclosed systems and methods may be used in many different products, such as engines, transmission equipment, and other machine components and products. Further, the disclosed systems and methods may be used to provide efficient and accurate diagnostic and prognostic systems for emission systems on vehicles.

The disclosed systems and methods may also be used in electrical and electronic systems to increase robustness of the systems by improving the predictability of system failure and identifying sources for failure to enhance so-called limp-home capability. The disclosed system and methods can also change the sensor topology to minimize exposure to sensors with below-target quality and reliability. System stability and reliability may also be improved by monitoring and controlling interactions among virtual sensors that are neither considered when building individual virtual sensors nor tested after building the individual virtual sensors The disclosed systems and methods may be used in a wide range of virtual sensors, such as sensors for engines, structures, environments, and materials. In particular, the disclosed systems and methods provide practical solutions where physical sensors are expensive to be included and/or retro-fitting certain sensors is necessary. That is, the disclosed virtual sensor systems may be used to retrofit a machine with new functionalities without installing or changing new hardware devices, while such new functionalities usually require new hardware devices, such as physical sensors, to be installed. Further, the disclosed systems and methods may be used in combination with other process modeling techniques to significantly increase speed, practicality, and/or flexibility.

The disclosed systems and methods may also provide efficient methods to determine types and qualities of sensors in a product. By choosing appropriate types of sensors and appropriate qualities of sensors, product cost may be reduced and product quality may be increased. Furthermore, the disclosed systems and methods may provide a desired way to provide calibration certificates for virtual sensor networks or individual virtual sensors to improve usability of virtual sensor networks and individual virtual sensors, as well as to improve measurement accuracy.

The disclosed systems and methods may further provide desired ways to publish the virtual sensor network for the purpose of establishment, verification, and auditing of the virtual sensor network. The published virtual sensor network may be used by different users or manufactures to establish stable, repeatable, auditable, and standard-compatible virtual sensor networks.

The disclosed systems and methods may also be used by machine manufacturers to reduce cost and increase reliability by replacing costly or failure-prone physical sensors. Reliability and flexibility may also be improved by adding backup sensing resources via the disclosed virtual sensor network system. The disclosed virtual sensor techniques may be used to provide a wide range of parameters in components such as emission, engine, transmission, navigation, and/or control.

Other embodiments, features, aspects, and principles of the disclosed exemplary systems will be apparent to those skilled in the art and may be implemented in various environments and systems.

What is claimed is:

1. A computer-implemented method for providing a virtual sensor network based system, comprising:
   obtaining project data descriptive of a virtual sensor network to be used in a control system of a machine;
   establishing a virtual sensor network including a plurality of virtual sensors based on the project data, each virtual sensor having a model type, at least one input parameter, and at least one output parameter;
   receiving model information, measurement data, and performance information for the virtual sensor network;
   verifying performance of the virtual sensor network based on the performance information and measurement data;
   responsive to verifying the performance of the virtual sensor network, creating one or more calibration certificates of the virtual sensor network based on the model information, the measurement data, and the performance information;
   generating a documentation package associated with the virtual sensor network, wherein the documentation package includes at least an identification of the virtual sensor network, the project data, and the one or more calibration certificates of the virtual sensor network; and
   publishing the virtual sensor network in compliance with a standard based on the documentation package associated with the virtual sensor network.

2. The method according to claim 1, wherein the receiving includes:
   deploying the virtual sensor network and the plurality of virtual sensors on a selected deployment target;
   operating the virtual sensor network on the deployment target; and
   logging the measurement and performance information during operation of the virtual sensor network.

3. The method according to claim 2, wherein the deployment target is a fixed-point component and the deploying includes:
   converting data information of the virtual sensor network into fixed-point representation;
   converting function information of the virtual sensor network into fixed-point representation; and
   loading the converted virtual sensor network to the deployment target for fixed-point operation.

4. The method according to claim 1, wherein the receiving includes:
   verifying a passage of performance of the virtual sensor network based on the performance information;
   creating the identification for the virtual sensor network; and
   embedding the identification in the virtual sensor network such that the identification cannot be changed for the virtual sensor network.

5. The method according to claim 4, wherein the identification is a serial number.

6. The method according to claim 1, wherein the establishing includes:
   integrating the plurality of virtual sensors into the virtual sensor network;
   determining a feedback relationship between the output parameter of one virtual sensor from the plurality of virtual sensors and the input parameter of one or more of other virtual sensors from the plurality of virtual sensors;
   storing the feedback relationship in a table;
   obtaining operational information of the plurality of virtual sensors;
   monitoring the interdependencies of the plurality of virtual sensors;
   determining an occurrence of a condition under which the output parameter of an individual virtual sensor is associated with the input parameter of another virtual sensor from the virtual sensor network; and determining that the other virtual sensor is unfit to operate based on the condition.

7. The method according to claim 6, before determining the occurrence, further comprising:
determining whether a value of the input parameter of the individual virtual sensor is not within a valid input space of the individual virtual sensor; and
determining that the individual virtual sensor is unfit to operate if the value is not within the valid input space.

8. The method according to claim 7, further comprising:
enabling internal data logging if an virtual sensor is determined to be unfit to operate.

9. The method according to claim 1, wherein the documentation package further includes a time stamp, virtual sensor network model information, and compliance data.

10. The method according to claim 1, wherein:
the calibration certificate includes normal ranges of operational parameters of the virtual sensor network and a plurality of standard uncertainties corresponding to the operational parameters; and
an uncertainty of the output parameter is contributed to by an uncertainty of the input parameter.

11. The method according to 10, wherein the plurality of standard uncertainties from the calibration certificate further includes:
an identification of sources of the plurality of uncertainties;
standard uncertainties based upon a Type A evaluation and a Type B evaluation, and;
standard uncertainties caused from random effects and systematic effects.

12. The method according to claim 2, wherein integrating includes:
obtaining data records corresponding to the plurality of virtual sensors;
obtaining model and configuration information of the plurality of virtual sensors;
determining applicable model types of the plurality of virtual sensors and corresponding footprints and accuracy;
selecting a combination of model types for the plurality of virtual sensors;
calculating an overall footprint and accuracy of the virtual sensor network based on the combination of model types of the plurality of virtual sensors; and
selecting the combination if the overall footprint and accuracy are desired based on predetermined criteria.

13. A computing system for providing a virtual sensor network based system, comprising:
a storage unit storing information associated with the virtual sensor network; and
a computer processor configured to:
obtain project data descriptive of a virtual sensor network to be used in a control system of a machine;
establish a virtual sensor network including a plurality of virtual sensors based on the project data, each virtual sensor having a model type, at least one input parameter, and at least one output parameter;
obtain logged information including model information, measurement data, and performance information of the virtual sensor network including the plurality of virtual sensors;
verify performance of the virtual sensor network based on the received performance information;
responsive to verifying performance of the virtual sensor network, create one or more calibration certificates of the virtual sensor network based on the model information, the measurement data, and the performance information;
generate a documentation package associated with the virtual sensor network, wherein the documentation package includes at least an identification of the virtual sensor network, the project data, and the one or more calibration certificates of the virtual sensor network; and
publish the virtual sensor network in compliance with a standard based on the documentation package associated with the virtual sensor network.

14. The system according to claim 13, wherein, to obtain the logged information, the processor is further configured to:
deploy the virtual sensor network and the plurality of virtual sensors on a selected deployment target;
enable a log functionality of the virtual sensor network on the deployment target where the virtual sensor network is operating; and
receive the logged information from the virtual sensor network.

15. The system according to claim 14, wherein the deployment target is a fixed-point component and, to deploy, the processor is further configured to:
convert data information of the virtual sensor network into fixed-point representation;
convert function information of the virtual sensor network into fixed-point representation; and
load the converted virtual sensor network to the deployment target for fixed-point operation.

16. The system according to claim 13, wherein, to obtain, the processor is further configured to:
verify a passage of performance of the virtual sensor network based on the performance information;
create the identification for the virtual sensor network; and
embed the identification in the virtual sensor network such that the identification cannot be changed for the virtual sensor network.

17. The system according to claim 16, wherein the identification is a serial number.

18. The system according to claim 13, wherein, to establish, the processor is further configured to:
integrate the plurality of virtual sensors into the virtual sensor network;
determine a feedback relationship between the output parameter of one virtual sensor from the plurality of virtual sensors and the input parameter of one or more of other virtual sensors from the plurality of virtual sensors;
store the feedback relationship in a table;
obtain operational information of the plurality of virtual sensors;
monitor the interdependencies of the plurality of virtual sensors;
determine an occurrence of a condition under which the output parameter of an individual virtual sensor is associated with the input parameter of another virtual sensor from the virtual sensor network; and
determine that the other virtual sensor is unfit to operate based on the condition.

19. The system according to claim 13, wherein the documentation package further includes a time stamp, virtual sensor network model information, and compliance data.

20. The system according to claim 13, wherein:
the calibration certificate includes normal ranges of operational parameters of the virtual sensor network and a plurality of standard uncertainties corresponding to the operational parameters; and
an uncertainty of the output parameter is contributed to by an uncertainty of the input parameter.

21. The system according to 20, wherein the plurality of standard uncertainties from the calibration certificate further includes:
- an identification of sources of the plurality of uncertainties;
- standard uncertainties based upon a Type A evaluation and a Type B evaluation, and
- standard uncertainties caused from random effects and systematic effects.

22. The system according to claim 14, wherein, to integrate, the processor is further configured to:
- obtain data records corresponding to the plurality of virtual sensors;
- obtain model and configuration information of the plurality of virtual sensors;
- determine applicable model types of the plurality of virtual sensors and corresponding footprints and accuracy;
- select a combination of model types for the plurality of virtual sensors;
- calculate an overall footprint and accuracy of the virtual sensor network based on the combination of model types of the plurality of virtual sensors; and
- select the combination if the overall footprint and accuracy are desired based on predetermined criteria.

23. A computer-implemented method for providing a virtual sensor network based system, comprising:
- obtaining project data associated with a virtual sensor network to be used in a control system of a machine;
- establishing a virtual sensor network including a plurality of virtual sensors based on the project data, the virtual sensors having a model type, at least one input parameter, and at least one output parameter;
- deploying the virtual sensor network on a selected deployment target;
- operating the virtual sensor network on the deployment target to obtain performance data and measurement data for the virtual sensor network;
- logging the measurement data and the performance data during operation of the virtual sensor network;
- verifying performance of the virtual sensor network based on the logged performance data and measurement data;
- responsive to verifying the performance of the virtual sensor network, generating one or more calibration certificates for the virtual sensor network based on model information for the virtual sensor network, the measurement data, and the performance data;
- generating a documentation package for the virtual sensor network, the documentation package including at least an identification of the virtual sensor network, the project data, and the one or more calibration certificates for the virtual sensor network; and
- publishing the virtual sensor network in compliance with a standard by making the virtual sensor network and the documentation package associated with the virtual sensor network publicly available to users.

* * * * *